United States Patent
Goh et al.

(10) Patent No.: US 12,210,111 B2
(45) Date of Patent: Jan. 28, 2025

(54) METHOD AND APPARATUS FOR LOCATING MISPLACED CELL PHONE WITH TWO HIGH ACCURACY DISTANCE MEASUREMENT (HADM) STREAMS FROM EARBUDS AND VICE VERSA

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 172 days.

(21) Appl. No.: 17/874,881

(22) Filed: Jul. 27, 2022

(65) Prior Publication Data

US 2024/0036151 A1  Feb. 1, 2024

(51) Int. Cl.
  *G01S 5/02* (2010.01)
  *G01C 17/28* (2006.01)
  *G08B 21/24* (2006.01)

(52) U.S. Cl.
  CPC ............ *G01S 5/0264* (2020.05); *G01C 17/28* (2013.01); *G08B 21/24* (2013.01)

(58) Field of Classification Search
  CPC ........ A45C 11/00; G01C 1/163; G01C 17/28; G01C 21/00; G01C 21/20; G01C 21/362; G01S 5/26; G01S 5/0264; G01S 5/0289; G01S 13/4454; G02C 11/10; G06F 1/163; G06F 1/1694; G06F 3/162; G06F 3/167; G06F 16/39; G08B 3/1016; G08B 21/24; G10L 15/22; H04R 1/1016; H04R 25/554;
(Continued)

(56) References Cited

U.S. PATENT DOCUMENTS

| | | | |
|---|---|---|---|
| 10,267,868 B1* | 4/2019 | Latone | G01R 33/0023 |
| 11,102,655 B1 | 8/2021 | Young | |
| 2017/0215011 A1* | 7/2017 | Goldstein | H04R 25/305 |

(Continued)

FOREIGN PATENT DOCUMENTS

| | | |
|---|---|---|
| WO | 2013/144371 A1 | 10/2013 |
| WO | 2021/142290 A2 | 7/2021 |

*Primary Examiner* — Stephen R Burgdorf
(74) *Attorney, Agent, or Firm* — Prol Intellectual Property Law, PLLC; H. Kenneth Prol

(57) ABSTRACT

An earbud set includes a first earbud and second earbud that each include a speaker and a wireless radio wirelessly coupled to a companion information handling system. At least one of the first or second earbud includes a processor, a memory device, and a magnetometer. The earbud set may include a relative mapping system to determine an earbud fixed compass orientation a front-facing assigned alignment direction for the first earbud and the second earbud and determine an angular alignment difference between the earbud fixed compass orientation and a magnetic earth field compass direction of the companion information handling system. The relative mapping system to use wireless or ultrasonic signals to determine distance from the first and second earbud to the companion information handling system. The processor uses distance measurements and a difference between the distances to determine a distance and a direction to the companion information handling system.

20 Claims, 13 Drawing Sheets

(58) Field of Classification Search
CPC ....... H04W 4/02; H04W 4/021; H04W 4/023;
H04W 4/029
USPC .................................................... 340/539.32
See application file for complete search history.

(56) References Cited

U.S. PATENT DOCUMENTS

| | | |
|---|---|---|
| 2017/0257717 A1 | 9/2017 | Milevski |
| 2018/0014102 A1 | 1/2018 | Hirsch |
| 2018/0124495 A1 | 5/2018 | Boeseb |
| 2018/0199138 A1 | 7/2018 | Dusan |
| 2018/0353086 A1 | 12/2018 | Turner |
| 2019/0064344 A1 | 2/2019 | Turner |
| 2019/0247010 A1* | 8/2019 | Barnacka .................. A61B 8/02 |
| 2020/0145757 A1* | 5/2020 | Kraemer ................. H04R 29/00 |
| 2020/0333141 A1* | 10/2020 | Zhu ...................... H04B 17/318 |
| 2020/0387709 A1* | 12/2020 | Baykaner ............ G06F 3/04842 |
| 2020/0404423 A1 | 12/2020 | Dusan |
| 2021/0385606 A1* | 12/2021 | Chen ........................ H04S 7/304 |
| 2021/0401307 A1 | 12/2021 | Turner |
| 2022/0038819 A1 | 2/2022 | Dusan |
| 2022/0201429 A1 | 6/2022 | Schoenberg |
| 2022/0390580 A1* | 12/2022 | Bonde .................... H04W 4/023 |
| 2023/0297320 A1* | 9/2023 | Abildgren ............. H04W 4/021 381/77 |

* cited by examiner

METHOD AND APPARATUS FOR LOCATING MISPLACED CELL PHONE WITH TWO HIGH ACCURACY DISTANCE MEASUREMENT (HADM) STREAMS FROM EARBUDS AND VICE VERSA

FIELD OF THE DISCLOSURE

The present disclosure generally relates to earbuds and/or companion information handling systems. The present disclosure more specifically relates to locating lost earbuds and/or companion information handling systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled to a set of earbuds used to provide audio output to a user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1A:
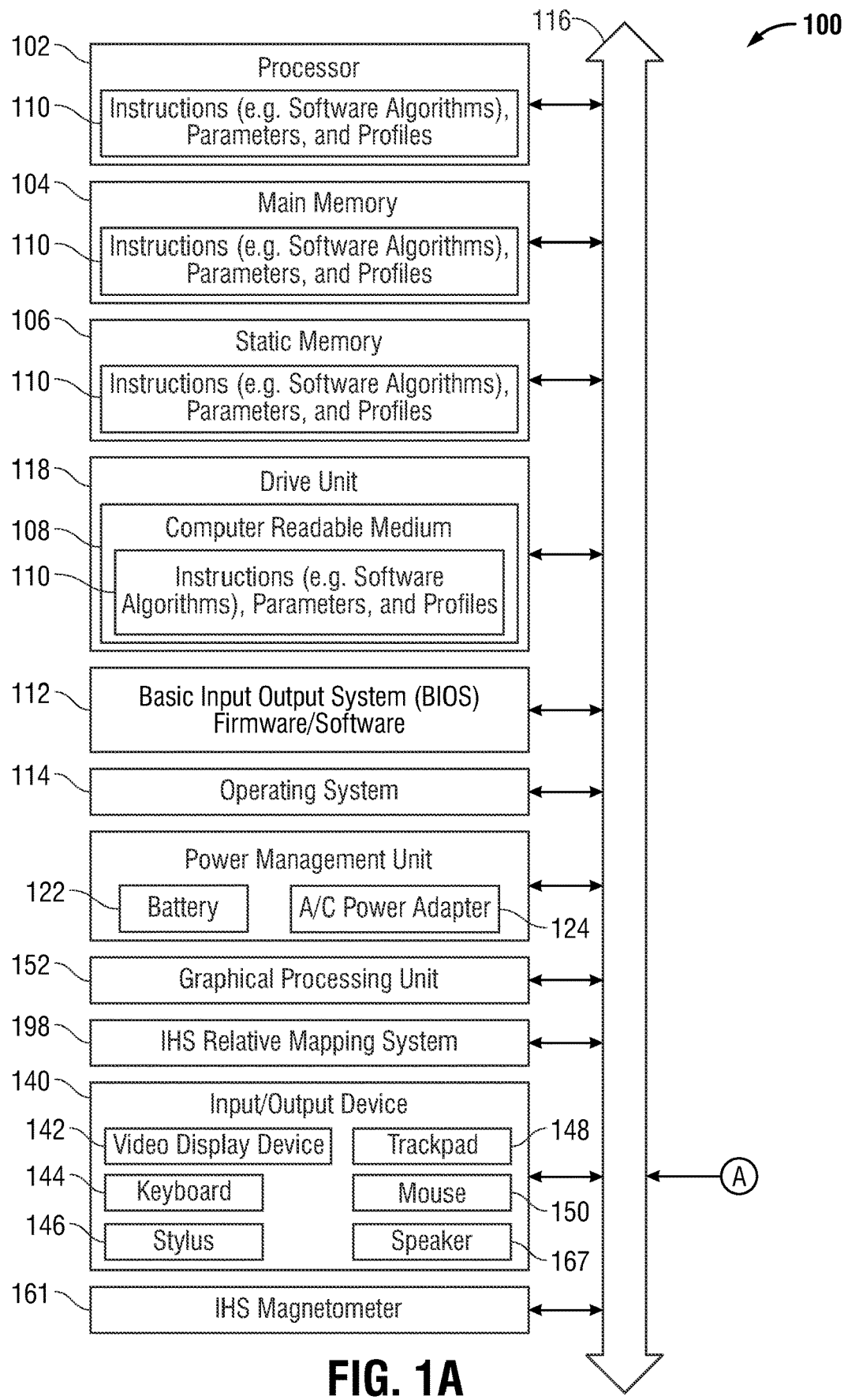
FIG. 1A is a block diagram of an information handling system operatively couplable to a set of earbuds according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Earbuds are relatively small devices that fit into a user's ears. Because they are to be fitted into a user's ear, they are small enough that the tendency to lose one or both of the earbuds is relatively high. Similarly, although other electronic devices such as smartphones, tablets, and laptops are relatively larger than an earbud, these devices as well may be lost. Because these devices are expensive or contains access to valuable information, the user may spend a large amount of time attempting to find them.

The present specification describes an earbud set that includes a first earbud and a second earbud used to fit into a first ear and second ear, respectively, of a user. Each of the first earbud and second earbud include a speaker and a wireless radio to operatively couple each earbud to a companion information handling system as well as with each other. In the present specification and in the appended claims, a companion information handling system is an information handling system that is operatively coupled or couplable to the earbuds in order for the companion information handling system to provide an audio stream to the earbuds to receive audio output therefrom via a speaker in the earbuds.

In an embodiment, the first earbud and/or second earbud may include an earbud relative mapping system that, when executed by a processing device, determines a font-facing direction of each earbud to determine compass data. Each of the first earbud and second earbud may include a magnetometer that is part of an accelerometer to determine which directions are north, south, east, and west. In an embodiment, the magnetometer may initially determine whether or not the earbuds are lined up north to south or south to north and/or, in an embodiment, the companion information handling system's relative position to each earbud. The earbud relative mapping systems may then, when executed by the processor, cause this compass data to be sent to a companion information handling system so that the companion information handling system may be provided with data describing the earbuds compass orientations. Similarly, a request for compass data may be made to the companion information handling system which then sends this compass data (e.g., the compass orientation of the companion information handling system). Via execution of a companion information handling system relative mapping system, the companion information handling system may also provide audio messages to the earbuds that provide instructions to the user regarding where to move in order to find the companion information handling system. The companion information handling system relative mapping system and earbud relative mapping systems, therefor, coordinate with each other so that each of these devices angular direction and distance location of where each other are relative to each other is known.

In an embodiment, the companion information handling system relative mapping system may direct the earbuds to engage their Bluetooth® high-accuracy distance measurement (HADM) features. These HADM features provides data to the companion information handling system informing the companion information handling system of the difference in distance between the first earbud and the companion information handling system and the second earbud and the companion information handling system. With the compass data and the HADM data, the right and left position of the companion information handling system relative to the first earbud and second earbud. The compass data is also used by the relative mapping system (e.g., either the companion information handling system relative mapping system or earbud relative mapping system) to determine the earbud orientation relative to the companion information handling system. With this data determined, the audio instructions provided to the user via the speakers of the earbuds may guide the user to the companion information handling system in order for the user to find the companion information handling system.

Figure 1B:
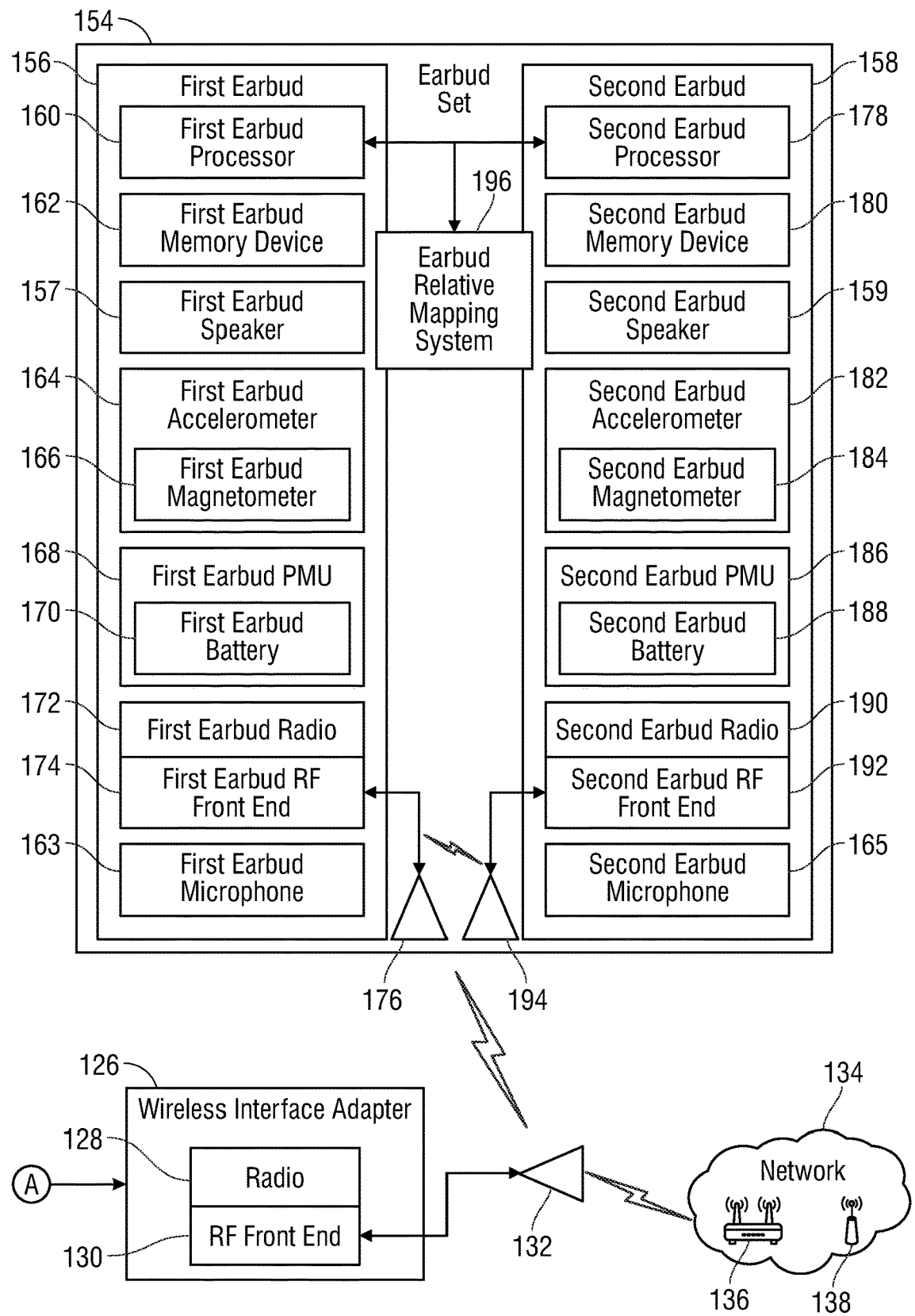
FIG. 1B is a block diagram of an earbud set operatively couplable to an information handling system according to another embodiment of the present disclosure.

FIG. 1A illustrates an information handling system 100 similar to information handling systems according to several aspects of the present disclosure that is operatively couplable to a pair of earbuds depicted, in an embodiment, in FIG. 1B. FIG. 1B illustrates a pair of earbuds operatively couplable to an information handling system depicted, in an embodiment, in FIG. 1A. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any wireless peripheral devices such as an earbud set 154. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, an earbud set 154, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, an earbud set 154 that provides audio output to a user, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. As described herein, the interface adapter 126 may operatively couple the pair of earbuds or an earbud set (FIG. 1B, 154) via a wireless connection. As shown in FIGS. 1A and 1B, the interface adapter 126 is operatively coupled to the companion information handling system via a bus as depicted via a "A" designated in a circle in both FIGS. 1A and 1B. In an embodiment, the WAN, WWAN, LAN, and WLAN may each include an access point 136 or base station 138 used to operatively couple the information handling system 100 to a network 134 and, in an embodiment, to a speakerphone 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an earbud set 154 described herein, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, the earbud set 154 described in embodiments herein, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or WiFi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the −5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication including the earbud set 154 described herein. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may be operatively coupled to an earbud set 154. The earbud set 154 may include a first earbud 156 and a second earbud 158 that are to be placed into the user's ears. During operation, in an embodiment, the information handling system 100 may provide audio data to the earbud set 154 so that a first earbud speaker 157 and second earbud speaker 159 may provide audio output to a user. This earbud set 154 may be used by the user to listen to podcasts, streaming music, audio books and the like. As described herein, this earbud set 154 may be operatively coupled to a companion information handling system 100 via wireless connection using the first earbud radio 172, first earbud RF front end 174, and first earbud antenna 176 and the second earbud radio 190, second earbud RF front end 192, and second earbud antenna 194 to operatively couple the earbud set 154 to the radio 128 of the companion information handling system 100. This forms a companion relationship between the companion information handling system 100 and earbud set 154. In the present specification and in the appended claims the term companion information handling system 100 is meant to be understood as an information handling system (e.g., a smartphone, a tablet, a laptop, and other information handling systems described herein) that operates with the earbud set 154. A feature of this companion relationship between the companion information handling system 100 and the earbud set 154 may include a Bluetooth® connection being used to allow the earbud set 154 and companion information handling system 100 to communicate with each other. This Bluetooth® connection may be initiated by either of the earbud set 154 or companion information handling system 100 via a pairing process.

During use, the user may lose one of the first earbud 156, second earbud 158, or companion information handling system 100. For example, where the user is exercising on a grassy field, one or both of the first earbud 156 and second earbud 158 may be dislodged from the user's ears and may fall into the grass. The user may spend a significant amount of time looking for the lost earbuds. Similar situations may arise where one or both of the first earbud 156 and second earbud 158 are lost in a couch cushion when the user sits down, and they fall out of the user's pocket. Additionally, the user may accidentally misplace the companion information handling system 100 in other situations such as misplacing the companion information handling system in a different room in a home or office. The loss of these devices may result in the user spending a significant amount of money to replace these items. In the case of a lost companion information handling system 100, data maintained on the companion information handling system 100 and potentially found by another person may be valuable.

To prevent permanent loss of either the earbud set 154 or the companion information handling system 100, the present specification describes a relative mapping system 196, 198 executable by a processing device on the first earbud 156, second earbud 158, and/or the companion information handling system 100 that directs a user to the location of the lost device.

In an embodiment of the present specification, an earbud set 154 may include an earbud relative mapping system 196. The earbud relative mapping system 196 may be used by the user to find a lost companion information handling system 100. The processes may begin with the user discovering that, in this example embodiment, that the companion information handling system 100 has been lost. The user may then initiate the earbud relative mapping system 196 by providing input to one or both of the first earbud 156 and second earbud 158. In an embodiment, this input may include concurrently actuating a touch pad on each of the first earbud 156 and second earbud 158. This may include the user touching the touch pad on the first earbud 156 and second earbud 158 for a set duration of time. When the earbud relative mapping system 196 is activated by the user, the first earbud 156 and/or second earbud 158 may send an event code to the companion information handling system 100 to find the companion information handling system 100. This "find companion information handling system 100" event code is received by the companion information handling system 100 wirelessly and launches, in an embodiment, its own information handling system relative mapping system 198. Among other actions, the execution of the information handling system relative mapping system 198 by, for example, the processor 102 may cause the companion information handling system 100 to ring and/or vibrate (e.g., provide haptic feedback) for the user to hear.

However, this ringing and vibration of the companion information handling system 100 may not help the user to find the companion information handling system 100 especially where the user is currently wearing the first earbud 156 and the second earbud 158. The earbud relative mapping system 196 and/or information handling system relative mapping system 198 may direct a user towards the companion information handling system 100 for the user to find the companion information handling system 100.

The execution of the information handling system relative mapping system 198 by the processor 102 may further cause the companion information handling system 100 to determine an orientation of the companion information handling system 100 relative to the earth's magnetic field. In this embodiment, a magnetometer 161 of the companion information handling system 100 may measure the earth's magnetic field, determine a north direction, a south direction, an east direction, and a west direction and compile this compass data that defines the orientation of the companion information handling system 100 relative to the earth's magnetic field. This companion information handling system 100 compass data may be used later to direct the user, via the first earbud 156 and second earbud 158, to the companion information handling system 100.

The companion information handling system 100 may further execute the information handling system relative mapping system 198 by the processor 102 to request and receive similar compass data from the first earbud 156 and the second earbud 158. The first earbud 156, in an embodiment, includes a first earbud processor 160, first earbud memory device 162, and first earbud accelerometer 164 with a first earbud magnetometer 166 to gather this compass data. In an embodiment, the first earbud processor 160 may be a microcontroller unit (MCU), or may be a CPU, an APU, a NPU, a VPU, an EC, a DSP, a GPU, or any other type of processing device that executes the computer code instructions of the earbud relative mapping system 196 used to gather this compass data. In an embodiment, because of the physical sizes of the first earbud 156 and second earbud 158, the first earbud processor 160 and second earbud processor 178 may be a microcontroller or other controller or MCU. The execution of the earbud relative mapping system 196 by both the first earbud 156 and second earbud 158 by their respective processors 160, 178 causes the first earbud 156 and second earbud 158 to determine a north direction, a south direction, an east direction, and a west direction and compile this compass data that defines the orientation of each of the first earbud 156 and second earbud 158 relative to the earth's magnetic field. This compass data may be used later to direct the user, via the first earbud 156 and second earbud 158, to the companion information handling system 100. In order to generate this compass data, each of the first earbud 156 and second earbud 158 may include a first earbud accelerometer 164 and second earbud accelerometer 182, respectively, that each include their own first earbud magnetometer 166 and second earbud magnetometer 184. The respective accelerometers 164, 182 and magnetometers 166, 184 are used to generate the compass data similar to the process used by the companion information handling system 100 to generate this compass data. The generated compass data from each of the first earbud 156 and second earbud 158 may be sent to the companion information handling system 100.

In an embodiment, the execution of the information handling system relative mapping system 198 by the processor 102 may further send a request to the first earbud 156 and second earbud 158 for the first earbud 156 and second earbud 158 to activate their respective high-accuracy distance measurement (HADM) system. The HADM system may be a feature of the Bluetooth® communication systems within the first earbud 156 and second earbud 158 that use time-of-flight (ToF) data to determine a distance between the first earbud 156 and second earbud 158, individually, to a signal source such as the companion information handling system 100. ToF data includes measurements of the time taken for a data packet (e.g., a ping) to be transmitted to or from each of the first earbud 156 and second earbud 158 to the companion information handling system 100. Because the time of flight is known as well as the speed of the transmission of the data packets (e.g., speed of light), the distance between the first earbud 156 and second earbud 158 to the companion information handling system 100 may be calculated by the first earbud processor 160 and second earbud processor 178 to produce the requested HADM data. This HADM data may be sent from each of the first earbud 156 and second earbud 158 to the companion information handling system 100 as requested.

In an embodiment, the execution of the information handling system relative mapping system 198 by the processor 102 may further cause an ultrasonic noise to be produced by a speaker 167 of the companion information handling system 100. In an embodiment, the ultrasonic noise produced by the speaker 167 may be used to determine a difference in the distance between the first earbud 156 and the companion information handling system 100 and the second earbud 158. The distance between the first earbud 156 and the companion information handling system 100 is determined based on the emission time of the ultrasonic noise by the speaker 167 and the detection of the ultrasonic noise at the first earbud microphone 163. The companion information handling system may also have a speaker and a microphone for transmission and reception of ultrasonic sound. Because the speed of sound is a known constant, the distance between the first earbud 156 and companion information handling system 100 is determined. Still further, the distance between the second earbud 158 and the companion information handling system 100 is determined based on the emission time of the ultrasonic noise by the speaker 167 and the detection of the ultrasonic noise at the second earbud microphone 165. Because the speed of sound is a known constant, the distance between the second earbud 158 and companion information handling system 100 is determined. With these distances between the first earbud 156 and companion information handling system 100 and second earbud 158 and the companion information handling system 100, the location of the earbuds 156, 158 may be triangulated, trilaterated, or multilaterated such that the relative position of the first earbud 156 and second earbud 158 to the companion information handling system 100 is determined. The information handling system (IHS) relative mapping system 198 and/or the earbud relative mapping system 196 may make these distance and triangulation, trilateration, or multilateration calculations in an embodiment. It is appreciated that the HADM features of the Bluetooth® system and/or this ultrasonic noise may be used to find the distance of the first earbud 156 and second earbud 158 relative to the companion information handling system 100.

When the companion information handling system 100 has received the compass data and HADM data from each of the first earbud 156 and second earbud 158, the execution of the information handling system relative mapping system 198 may continue with calculating a first distance between the first earbud 156 and the companion information handling system 100 and a second distance between the second earbud 158 and the companion information handling system 100. In other embodiments, an estimated distance may be used for a typical width of a human head to the distance between the first earbud 156 and second earbud 158. The difference between the first distance and the second distance is also calculated to determine the relative distances of each of the first earbud 156 and second earbud 158 relative to the companion information handling system 100. Because, in an example embodiment, the first earbud 156 is a right ear earbud and the second earbud 158 is a left ear earbud the calculated difference between the first distance and second distance allows the companion information handling system 100 to know in which direction the user is facing as well as the position of both the first earbud 156 and second earbud 158 relative to the companion information handling system 100 (e.g., to the left of the companion information handling system 100 or to the right of the companion information handling system 100).

The execution of the information handling system relative mapping system 198 further includes mapping the north (N), south (S), east (E), and west (W) direction of the companion information handling system 100 and first earbud 156 and second earbud 158. This N, S, E, W, direction mapping also determines the first earbud 156 and second earbud 158 compass direction relative to the companion information handling system 100. With the mapped compass data and the HADM distance data being calculated, the companion information handling system 100 knows, within a range of certainty, where the first earbud 156 and second earbud 158 are located within an area relative to the companion information handling system 100. Then N, S, E, W direction mapping may assign an earbud fixed compass orientation with a direction assignment for the first earbud 156 and second earbud 158 in an embodiment. An example fixed earbud set of compass directions may assign S as "front," N as "back," W as "right," and E as "left." Any earbud fixed compass orientation set of compass directions may be used however in other embodiments. With this earbud fixed compass orientation with direction assignment, the earbud relative mapping system 196 may determine angular differences form the received magnetic compass orientation of the companion information handling system 100 for alignment with the earbuds 156 and 158.

At this point, the execution of the information handling system relative mapping system 198 may produce, at the companion information handling system 100, audible instructions to the user via the first earbud 156 and second earbud 158. These audible instructions provided may be dependent on the discovered relative location including angular direction and distance of the first earbud 156 and second earbud 158 to the companion information handling system 100. For example, where the information handling system relative mapping system 198 has discovered that the user has his or her back to the companion information handling system 100, the audible instructions may include instructions to the user to turn around. Other audible instructions may include instructions to move forward a certain number of steps, move left or right a certain number of steps, among other instructions. In an embodiment, further audible instructions may include a notice of how far away the user is from the information handling system relative mapping system 198. Each of these instructions are presented to the user via the first earbud speaker 157 and second earbud speaker 159 as described herein.

In an embodiment, the execution of the information handling system relative mapping system 198 by the processor 102 may cause an audible beeping sound to be produced at the first earbud 156 and second earbud 158. In an embodiment, the frequency of the beeping may increase as the user moves closer to the companion information handling system 100 and decrease in frequency as the user moves (e.g., accidentally) away from the companion information handling system 100. When the user reaches a threshold distance from the companion information handling system 100, a steady tone may be provided at the first earbud 156 and second earbud 158 in an embodiment.

It is appreciated that because the first earbud 156 and second earbud 158 includes the earbud relative mapping system 196, the earbuds may be used to find the lost companion information handling system 100. Similarly, the companion information handling system 100 may be used to find either or both of the first earbud 156 and second earbud 158 as well. In this latter example embodiment, the information handling system relative mapping system 198 may provide visual output to a user via a video display device 142 those instructions used to find the first earbud 156 and/or second earbud 158. Additionally, or alternatively, a speaker (not shown) on the companion information handling system 100 may also be used to provide audible instructions to the user.

Where the companion information handling system 100 is used to find a lost first earbud 156 or second earbud 158, the information handling system relative mapping system 198 may request the compass data and HADM data described herein from the first earbud 156 and second earbud 158 in order to calculate a relative location of the first earbud 156 and second earbud 158 to the companion information handling system 100. A graphical user interface may be presented on the video display device 142 of the companion information handling system 100 for the user to view a mapped location of the first earbud 156 and second earbud 158 relative to the companion information handling system 100. This visual cue may be enough for the user to be guided to the lost first earbud 156 and second earbud 158, but the GUI may provide a menu that allows a user to toggle on audible instructions used to find the first earbud 156 and second earbud 158. Still further, the execution of the information handling system relative mapping system 198 in this embodiment may send a signal to the first earbud 156 and second earbud 158 to produce a sound such as a beeping noise in order to audible detect the first earbud 156 and second earbud 158.

Each of the first earbud 156 and second earbud 158 may include a first earbud power management unit 168 and second earbud PMU 186, respectively. The first earbud PMU 168 and second earbud PMU 186 may manage the power provided to the components of the first earbud 156 and second earbud 158, respectively, such as the components of the first earbud 156 and second earbud 158 that may require power when powered on by the user. In an embodiment, the first earbud PMU 168 and second earbud PMU 186 may monitor power levels and be electrically coupled, either wired or wirelessly, to the companion information handling system 100. The first earbud PMU 168 and second earbud PMU 186 may regulate power from a power source such as a first earbud battery 170 and second earbud battery 188. In an embodiment, the batteries 170, 188 may be charged via an A/C power source and provide power to the components of the first earbud 156 and second earbud 158.

In an embodiment, the first earbud 156 and second earbud 158 may include a first earbud memory device 162 and second earbud memory device 180. These memory devices 162, 180 or other memory of the embodiments described herein may contain computer-readable medium (not shown), such as RAM in an example embodiment. An example of earbud memory devices 162, 180 includes random access memory (RAM) such as static RAM (SRAM), dynamic RAM (DRAM), non-volatile RAM (NV-RAM), or the like, read only memory (ROM), another type of memory, or a combination thereof. Static memory may contain computer-readable medium (not shown), such as NOR or NAND flash memory in some example embodiments. The applications and associated APIs described herein, for example, may be stored in static memory that may include access to a computer-readable medium such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
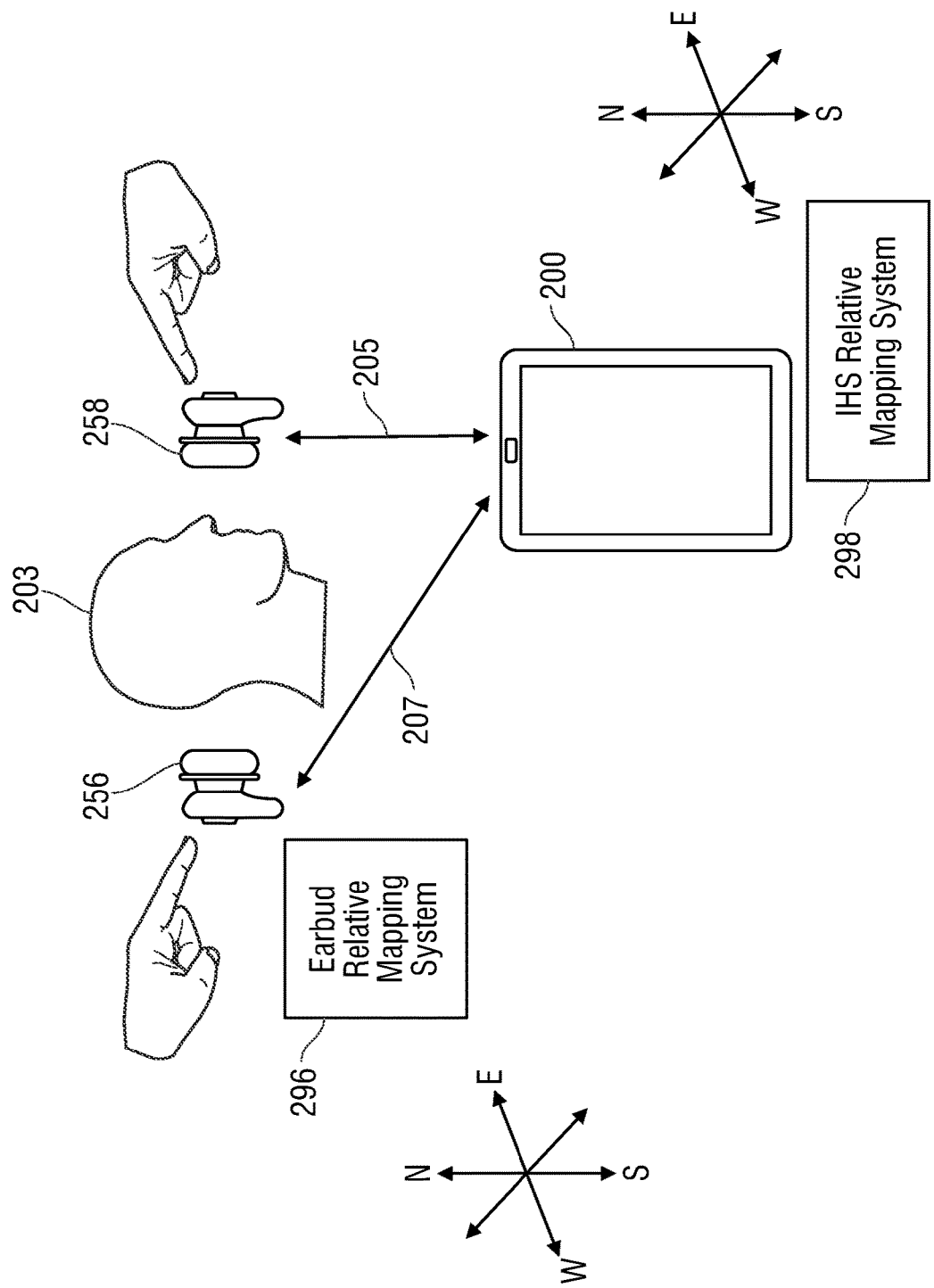
FIG. 2 is a graphic diagram of earbuds being used to find or be found by a companion information handling system according to an embodiment of the present disclosure.

FIG. 2 is a graphic diagram of earbuds 256, 258 being used to find or be found by a companion information handling system 200 according to an embodiment of the present disclosure. FIG. 2 shows a user 203 wearing a first earbud 256 (e.g., a right earbud) and a second earbud 258 (e.g., a left earbud). As described herein, these wireless earbuds 256, 258 may fit into a user's ears so that a user may listen to audio presented to the data via the wireless connection with the companion information handling system 200.

During use of the earbuds 256, 258 and companion information handling system 200, a user may misplace either of these devices as described herein. Where the user has lost one or both of the earbuds 256, 258, a user may activate an information handling system (IHS) relative mapping system 298 on the companion information handling system 200. As described herein, the IHS relative mapping system 298 requests and receives compass data and HADM from each of the first earbud 256 and second earbud 258. In an embodiment, the HADM data is received from each of the first earbud 256 and second earbud 258 after the companion information handling system 200 has requested that the first earbud 256 and second earbud 258 turn on their HADM Bluetooth® features allowing for the HADM data to be obtained. The right earbud 256 may transmit this HADM data and compass data as indicated by line 207 while the left earbud 258 transmits the HADM data and compass data as indicated by line 205. It is appreciated that lines 205 and 207 may also indicate a path of the ultrasonic sound emitted by the companion information handling system 200 or the earbuds 256, 258 used to find the distance of the first earbud 256 and second earbud 258 relative to the companion information handling system 200 as described above in connection with FIG. 1 according to another embodiment of the present disclosure.

Again, in some embodiments, the user may have mistakenly misplaced the companion information handling system 200. In this example embodiment, the user may activate an earbud relative mapping system 296 at the first earbud 256 and second earbud 258. In the embodiment shown in FIG. 2, this activation of the earbud relative mapping system 296 may be accomplished by the user concurrently touching a touch pad location on the first earbud 256 and second earbud 258 for a period of time. Some earbuds 256, 258 may include a touchable surface that allows a user to increase the volume of the audio, decrease the volume of the audio, skip tracks, among other features. In the embodiment shown in FIG. 2, the earbuds 256, 258 may receive this activation input of the earbud relative mapping system 296 by concurrently touching these touchable surfaces for a period of time (e.g., two seconds). When activated, the earbud relative mapping system 296 may conduct the exchange of the HADM data and compass data as described herein. This exchange of HADM data and compass data is shown, again, at lines 205 and 207 from the left earbud 258 and right earbud 256, respectively.

It is noted that because the companion information handling system 200 includes an information handling system relative mapping system 298 and at least one of the first earbud 256 and second earbud 258 includes an earbud relative mapping system 296, the gathering and processing of this data as well as exchange of compass orientation data and earbud fixed compass orientation data with assigned alignment direction as described herein may be accomplished at either the earbuds 256, 258 or the companion information handling system 200. In an embodiment, the relatively more available processing resources of the companion information handling system 200 may indicate that the processor of the companion information handling system 200 is to gather and process the HADM data and compass data.

Figure 3A:
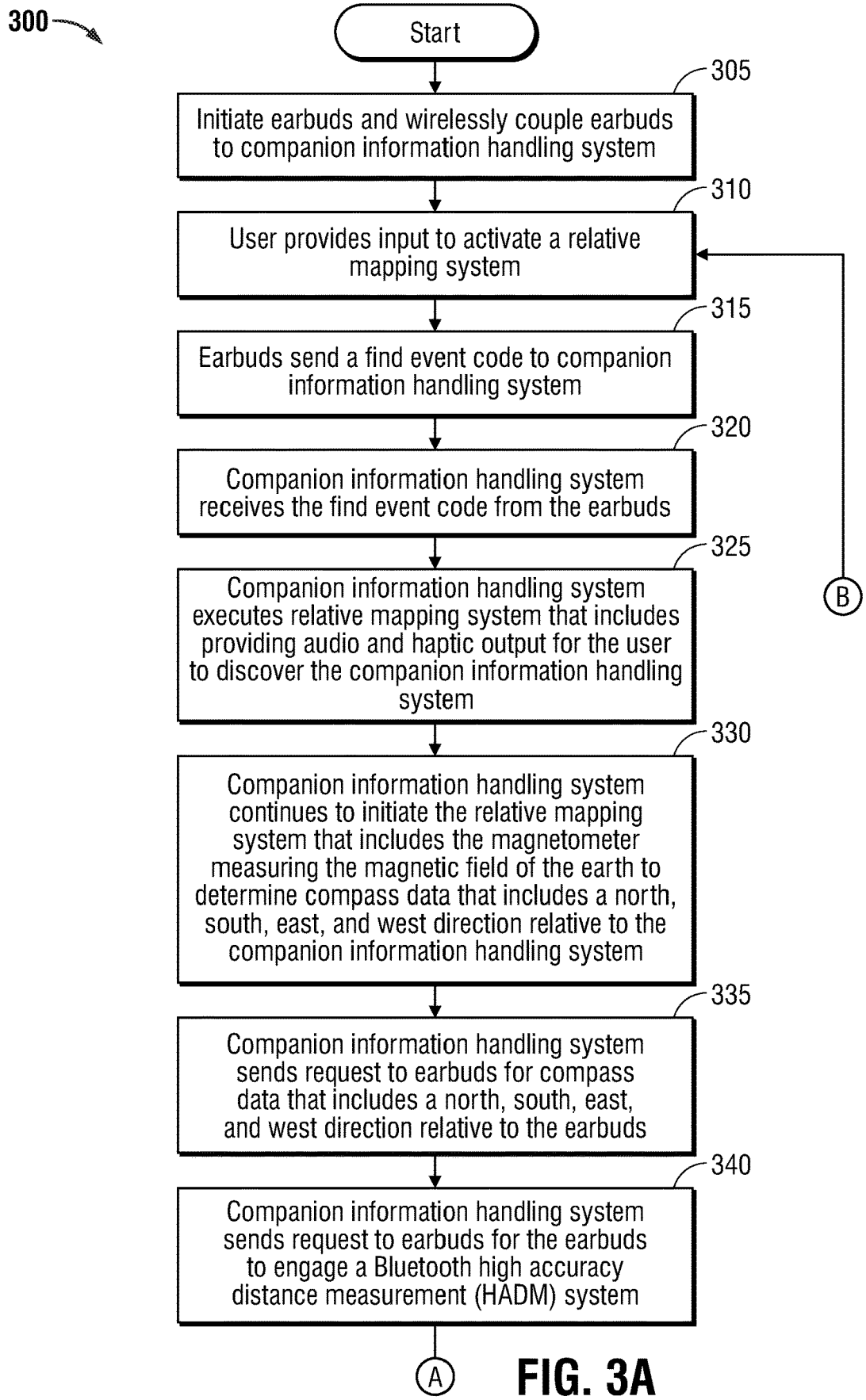
FIG. 3A is a first portion of a flow diagram of a method of locating a companion information handling system with a pair of earbuds according to an embodiment of the present disclosure.
Figure 3B:
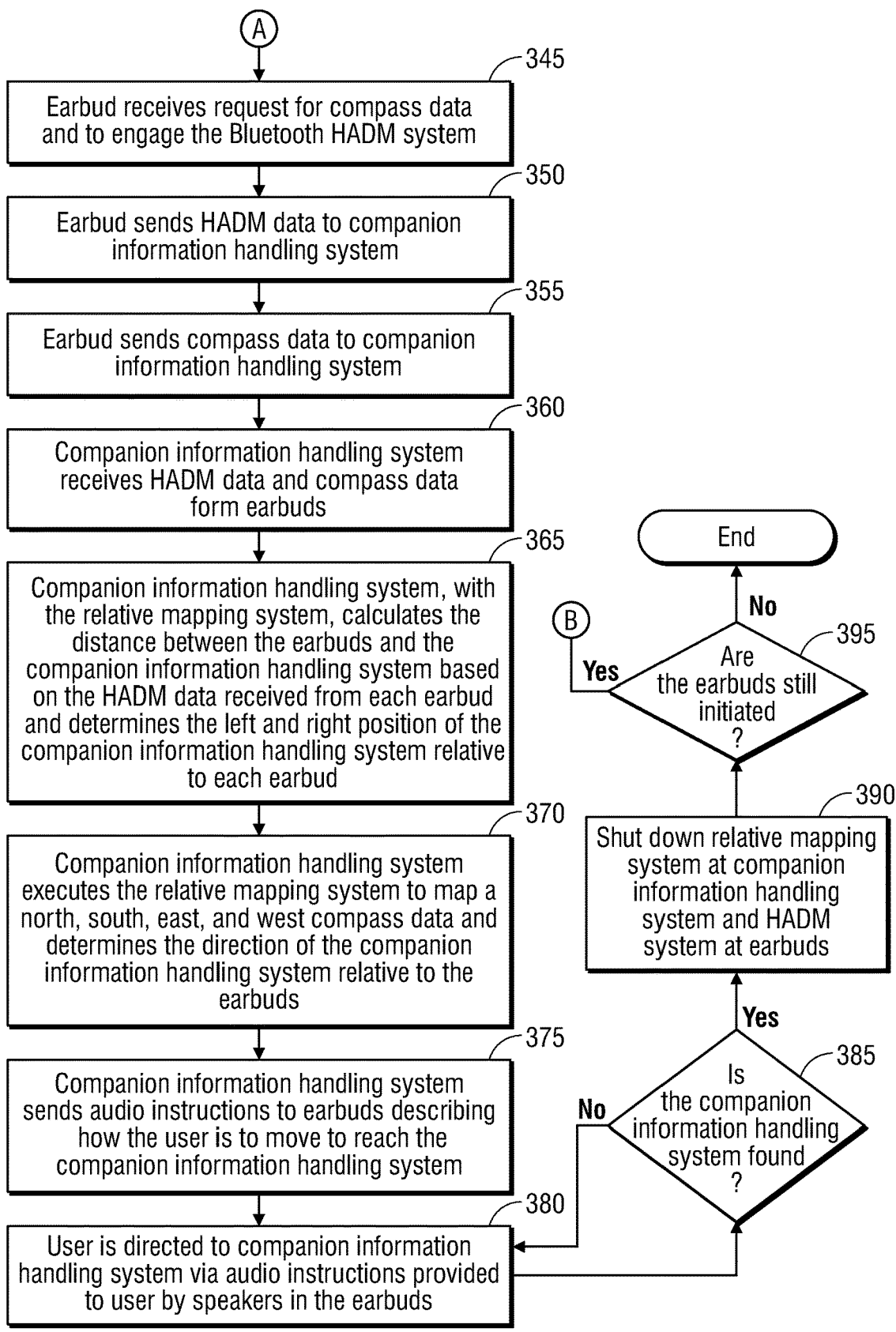
FIG. 3B is a second portion of a flow diagram of a method of locating a companion information handling system with a pair of earbuds according to another embodiment of the present disclosure.

FIG. 3A is a first portion of a flow diagram of a method 300 of locating a companion information handling system with a pair of earbuds according to an embodiment of the present disclosure. FIG. 3B is a second portion of a flow diagram of a method 300 of locating a companion information handling system with a pair of earbuds according to another embodiment of the present disclosure. The method 300 of FIGS. 3A and 3B describes a process of a user locating a companion information handling system that has been lost via the pair of earbuds. In an embodiment, the user may or may not be using the pair of earbuds to listen to audio and has noticed that the user has lost sight of the companion information handling system and needs to search for it. An example scenario includes a user using the pair of earbuds to listen to music while engaging in a video game on a television. In this scenario, the user's cell phone (e.g., a companion information handling system to the pair of earbuds) has slipped out of the user's pocket and has been lost in the cushions of a couch the user is sitting on. It is noted that this example scenario is merely a single example of a potential scenario in which the user is using the pair of earbuds while losing sight of the user's companion information handling system and the application contemplates other scenarios that cause the user to lose sight of the companion information handling system. The earbuds may execute code instructions of an earbud relative mapping system and the companion information handling system may execute code instructions of an information handling system (IHS) relative mapping system to perform any portion of the steps of FIGS. 3A and 3B or operate in coordination to perform any or most steps according to various embodiments herein. For purposes of ease of discussion, FIGS. 3A and 3B is described in parts where particular steps are performed by earbud relative mapping system and the IHS relative mapping system, but it is contemplated that any step, particularly for determining angular directions or distances, may be performed by either, according to embodiments of the present disclosure.

The method 300 may begin, at block 305 in FIG. 3A, with the user initiating the earbuds and wirelessly coupling the earbuds to the companion information handling system. As described herein, the wireless coupling of the pair of earbuds to the companion information handling system is accomplished through the activation of a wireless radio in each of the pair of earbuds and companion information handling system and transmitting data over that wireless connection. At this point, the user, in the example scenario, is listening to music via this wireless connection and has noticed that the user has lost sight of the companion information handling system.

The method 300 includes, at block 310, the user providing input to activate the relative mapping system at the pair of earbuds. In an embodiment, this input may include concurrently actuating a touch pad on each of the first earbud and second earbud. This may include the user touching the touch pad on the first earbud and second earbud for a set duration of time. However, the present specification contemplates that other input may be used to activate the earbud relative mapping system as described herein. For example, the pair of earbuds may be capable of receiving verbal commands from the user and the user may provide verbal input (e.g., "activate earbud relative mapping system" or "find my phone") to activate the earbud relative mapping system. Still further, dedicated hard buttons may be provided on the pair of earbuds that, when actuated by the use, causes the earbud relative mapping system to be executed by the processor(s) of the pair of earbuds.

At block 315, the method 300 includes the earbuds sending a find event code to the companion information handling system. This find event code may be sent (e.g., at block 315) and received (e.g., at block 320), wirelessly, at a processing device of the companion information handling system. In an embodiment, the find event code may be in the form of a specific request that, at block 325, causes the companion information handling system to execute an IHS relative mapping system. The IHS relative mapping system may, in an example embodiment, immediately cause the companion information handling system to provide audio and haptic output for the user to hear and/or feel the location of the companion information handling system. Although the user may have lost the companion information handling system, it may be within hearing or touch of the user for the user to discover. However, where the lost companion information handling system is not in a location where the user can hear (e.g., with or without the pair of earbuds being worn) the audio output from the companion information handling system, the method continues to block 330.

At block 330, the companion information handling system continues to initiate the relative mapping system that includes the magnetometer of the companion information handling system measuring the magnetic field of the earth to determine compass data that includes a north, south, east, and west direction relative to the companion information handling system. In this embodiment, a magnetometer may be part of an accelerometer of the companion information handling system may measure the earth's magnetic field, determine a north direction, a south direction, an east direction, and a west direction and compile this compass data that defines the orientation of the companion information handling system relative to the earth's magnetic field.

The method 300 includes, at block 335, the companion information handling system sending a request to the pair of earbuds for compass data that includes a north, south, east, and west direction relative to the earbuds. As described herein, each of the earbuds includes an accelerometer and magnetometer with the latter being capable of detecting the earth's magnetic field and providing compass data to the companion information handling system as described herein. This request to get compass data from the pair of earbuds by the companion information handling system may be done via a wireless Bluetooth® connection with the pair of earbuds. Additionally, in an embodiment, the receipt of the earbud compass data is done via a wireless Bluetooth® connection. In another embodiment, an earbud fixed compass orientation with assigned alignment directions may be requested indicating where the front, back, left, and right of the pair of earbuds are relative to the magnetic earbud compass data.

At block 340, the companion information handling system sends request to earbuds for the earbuds to engage a Bluetooth HADM system that is a feature of the Bluetooth communication protocols. As described herein, the HADM system may be a feature of the Bluetooth® communication systems within the first earbud and second earbud that each use time-of-flight (ToF) data to determine a distance between the first earbud and second earbud, individually, to a signal source such as the companion information handling system. ToF data includes measurements of the time taken for a data packet (e.g., a ping) to be transmitted to or from each of the first earbud and second earbud to the companion information handling system. Because the time of flight is known as well as the speed of the transmission of the data packets (e.g., speed of light), the distance between the first earbud and second earbud to the companion information handling system may be calculated by the first earbud processor and second earbud processor to produce the requested HADM data. In an alternative embodiment, send a request via a wireless link for an ultrasonic pathway to be established between the companion information handling system and the earbuds to exchange ultrasound signals between speaker and microphone which may provide ToF data as well as distances between earbuds or to the companion information handling system. At this point, the method 300 continues to block 345 on FIG. 3B as designated by the "A" in a circle.

The method 300 further includes, at block 345, with the earbud receiving the request for the earbud compass data and earbud fixed compass orientation data and the instructions to engage the Bluetooth HADM system or the ultrasonic distance system in various embodiments. Again, the use ToF data by the HADM system or the ultrasonic distance system to determine a distance between the first earbud and second earbud, individually, to the companion information handling system is calculated by a processing device on at least one of the first earbud or second earbud. ToF data includes measurements of the time taken for a data packet (e.g., a ping) to be transmitted to or from each of the first earbud and second earbud to the companion information handling system. Because the time of flight is known as well as the speed of the transmission of the data packets (e.g., speed of light) or ultrasonic signals (speed of sound), the distance between the first earbud and second earbud to the companion information handling system is calculated by the first earbud processor and second earbud processor based on the produced HADM signal data or ultrasonic signals. This HADM signal data or ultrasonic signal data may be processed to indicate relative distance to a companion information handling system as well as a relative direction due to distance difference to each earbud. The compass data is created by accessing a magnetometer at the first earbud or second earbud to determine an orientation of the earbuds relative to the earth's magnetic field. In this embodiment, a magnetometer of the earbuds may measure the earth's magnetic field, determine a north direction, a south direction, an east direction, and a west direction and compile this compass data that defines the orientation of each of the earbuds relative to the earth's magnetic field. Further, the earbud fixed compass orientation and assigned alignment directions for front, back, left, and right of the earbuds relative to the earth's magnetic field earbud compass direction data are also retrieved.

At block 350 the HADM signal data or ultrasonic signal data may be sent from each of the first earbud and second earbud to the companion information handling system as requested. The first earbud and second earbud may also, at block 355, send the earbud compass data to the companion information handling system as well as the earbud fixed compass orientation with assigned alignment directions for front, back, left, and right. At block 360, the companion information handling system receives the HADM or ultrasonic signal data and the earbud compass data and earbud fixed compass orientation from each of the earbuds via the wireless link, such as a Bluetooth® wireless link.

The method 300 also includes, at block 365, the companion information handling system, with the relative mapping system, calculates the distance between the earbuds and the companion information handling system based on the HADM signal data or ultrasonic signal data received from each earbud and determines the left and right position of the companion information handling system relative to each earbud. As described herein, a user may be oriented in a position where the companion information handling system is behind the user, in front of the user, to the left of the user, or to the right of the user. With the HADM signal data or ultrasonic signal data, and compass data, and the earbud fixed compass orientation and alignment directions for front, back, left, and right, at block 370, the companion information handling system executes the relative mapping system to map a north, south, east, and west compass data and determines the angular direction relative to front, back, left, and right, as well as distance of the companion information handling system relative to the earbuds. Again, the angular location relative to front, back, left, and right, as well as distance of the earbuds with respect to the companion information handling system also defines the location of the user relative to the companion information handling system because the user is wearing the earbuds.

The method 300 further includes the companion information handling system sending audio instructions to earbuds describing how the user is to move to reach the companion information handling system. These audible instructions provided at the earbuds by the companion information handling system may be dependent on the discovered relative location of the first earbud and second earbud to the companion information handling system. For example, where the information handling system relative mapping system has discovered that the user has his or her back to the companion information handling system, the audible instructions may include instructions to the user to turn around. Other audible instructions may include instructions to move forward a certain number of steps, move left or right a certain number of steps, among other instructions. A footstep, or step, by the user may be an assumed or fixed distance estimate in various embodiments. For example, a step may be set at 2.5 feet or approximately 0.75 meters in one particular embodiment. Any distance may be used in an embodiment, or a user may set a step distance in a profile setting in various embodiments. In an embodiment, further audible instructions may include a notice of how far away the user is from the information handling system relative mapping system. Each of these instructions are presented to the user via the first earbud speaker and second earbud speaker as described herein.

At block 380, the method 300 includes the user being directed to companion information handling system via audio instructions provided to user by speakers in the earbuds. This process may take any amount of time based on the location of the user relative to the companion information handling system and may require updated audio instructions to the user as those audible instructions are followed but the user has not reached the companion information handling system. Additionally, the audible instructions may be repeated if the user has not acted on the instructions (e.g., based on current relative location data associated with the earbuds) within a period of time.

The method 300 includes determining if the companion information handling system has been found at block 385. In an embodiment, if the user has found the companion information handling system, the user may provide input at a graphical user interface (GUI) presented on a video display device of the companion information handling system to indicate that the user has found the companion information handling system. Without this input, the companion information handling system may determine that the companion information handling system has not been found and the method 300 returns to block 380 until the user has found the companion information handling system.

Where the user has found the companion information handling system (e.g., provided input via the video display device), the method 300 continues to block 390 with the processing device of the companion information handling system shutting down the relative mapping system at companion information handling system and HADM system or ultrasonic distance system at earbuds. A user may touch a touchpad or both touchpads of the earbuds or provide some other input that the companion information handling system has been found in some embodiments. In an embodiment, the HADM system or ultrasonic distance system at the earbuds may be shut down so that the battery power of the earbuds may be conserved.

The method 300 further includes, at block 395, determining if the earbuds are still initiated. Where the earbuds are still operating, the method 300 may return to block 310 at FIG. 3A (e.g., as designated with an encircled "B") with monitoring for the user providing input to activate the relative mapping system on the earbuds as described herein. Where the earbuds have been shut down (e.g., put away in a charging station or disconnected from the wireless connection at the companion information handling system), the method 300 may end.

Figure 4A:
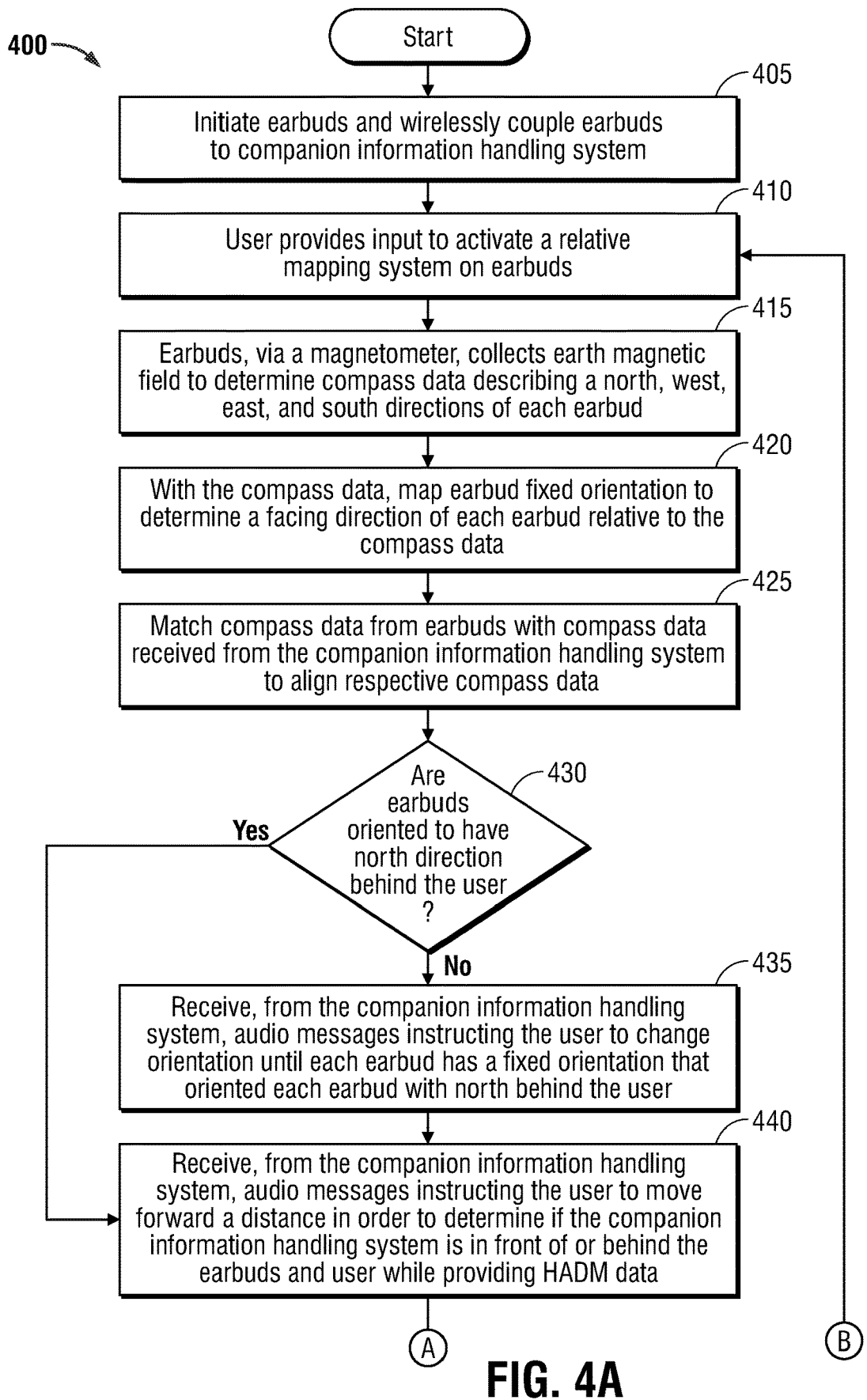
FIG. 4A is a first portion of a flow diagram of a method of using a magnetometer, a fixed earbud orientation, and high-accuracy distance measurement (HADM), to provide instructions to a user to find a companion information handling system according to an embodiment of the present disclosure.
Figure 4B:
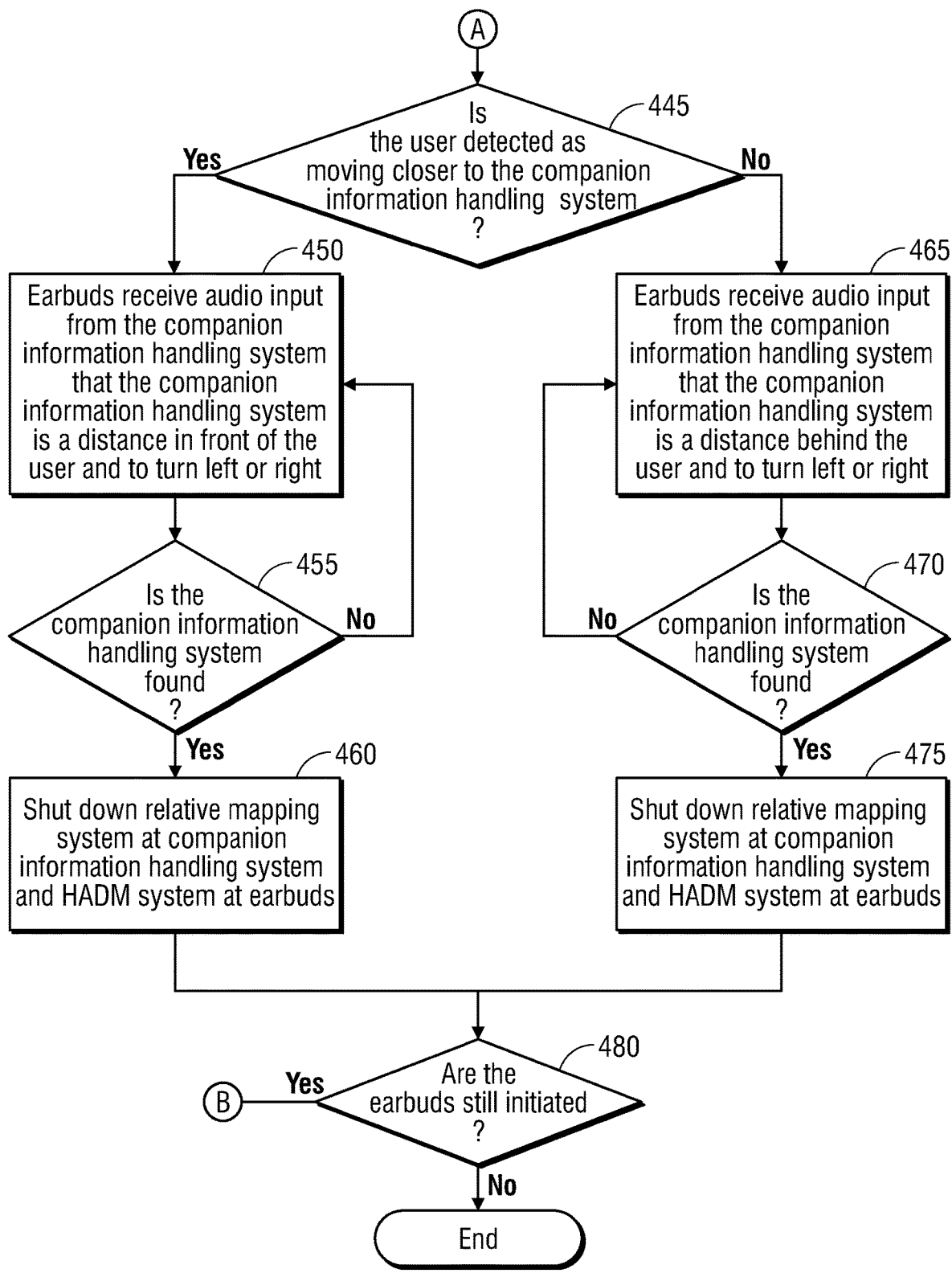
FIG. 4B is a second portion of a flow diagram of a method of using a magnetometer, a fixed earbud orientation, and high-accuracy distance measurement (HADM), to provide instructions to a user to find a companion information handling system according to another embodiment of the present disclosure.

FIG. 4A is a first portion of a flow diagram of a method 400 of using a magnetometer, a fixed earbud orientation, and high-accuracy distance measurement (HADM), to provide instructions to a user to find a companion information handling system according to an embodiment of the present disclosure. FIG. 4B is a second portion of a flow diagram of a method 400 of using a magnetometer, a fixed earbud orientation, and high-accuracy distance measurement (HADM), to provide instructions to a user to find a companion information handling system according to another embodiment of the present disclosure. The method described in FIGS. 4A and 4B use a magnetometer, a detected fixed orientation of the first earbud and second earbud, as well as HADM data in order to provide audible instructions to the user to find a lost companion information handling system. The earbuds may execute code instructions of an earbud relative mapping system and the companion information handling system may execute code instructions of an information handling system (IHS) relative mapping system to perform any portion of the steps of FIGS. 4A and 4B or operate in coordination to perform any or most steps according to various embodiments herein. For purposes of ease of discussion, FIGS. 4A and 4B are described in parts where particular steps are performed by earbud relative mapping system and the IHS relative mapping system, but it is contemplated that any step, particularly for determining angular directions or distances, may be performed by either, according to embodiments of the present disclosure.

The method 400 may begin, at block 405 in FIG. 4A, with the user initiating the earbuds and wirelessly coupling the earbuds to the companion information handling system. As described herein, the wireless coupling of the pair of earbuds to the companion information handling system is accomplished through the activation of a wireless radio in each of the pair of earbuds and companion information handling system and transmitting data over that wireless connection. At this point, the user, in the example scenario, is listening to music via this wireless connection and has noticed that the user has lost sight of the companion information handling system.

The method 400 includes, at block 410, the user providing input to activate the relative mapping system at the pair of earbuds. In an embodiment, this input may include concurrently actuating a touch pad on each of the first earbud and second earbud. This may include the user touching the touch pad on the first earbud and second earbud for a set duration of time. However, the present specification contemplates that other input may be used to activate the earbud relative mapping system as described herein. For example, the pair of earbuds may be capable of receiving verbal commands from the user and the user may provide verbal input (e.g., "activate earbud relative mapping system" or "find my phone") to activate the earbud relative mapping system. Still further, dedicated hard buttons may be provided on the pair of earbuds that, when actuated by the use, causes the earbud relative mapping system to be executed by the processor(s) of the pair of earbuds.

At block 415, the earbuds may each detect, with a magnetometer, the earth's magnetic field to determine compass data describing a north, west, east, and south directions of each earbud. In an embodiment, the detection of the earth's magnetic field may be conducted as a result of a request from a companion information handling system to get compass data from the pair of earbuds by the companion information handling system. The request may be done via a wireless Bluetooth® connection established by the companion information handling system with the pair of earbuds.

At block 420, the method includes mapping an earbud fixed compass orientation with an assigned direction alignment relative of front, back, left, and right to determine a facing direction of each earbud relative to the compass data using the earbud compass data obtained from the magnetometer. This earbud fixed compass orientation may be a direction that the user is facing and may, in some embodiments, not be aligned with a north-south direction of the earth's magnetic field. The mapping of this compass data determines the facing direction of the user relative to the earth's magnetic field based on a difference of earbud fixed compass orientation and the earbud compass data for the earth's magnetic field.

After this mapping at block 420, the method 400 includes, at block 425, matching compass data from the earbuds with compass data received from the companion information handling system to align respective compass data sets. This allows the respective compass data from each of the earbuds and the companion information handling system to be mapped relative to each other and provide for the earbuds (i.e., the user) to be moved into a known orientation relative to the companion information handling system.

The method 400 further includes determining, at block 430, whether each earbud is oriented to have a north direction behind the user. In some example scenarios, the fixed orientation of the earbuds may align north to south with the user's face facing south and the user's back facing north. This alignment of the user with the magnetic north-south field of the earth may, in some embodiments, increase the efficiency of finding the companion information handling system. The alignment of the earbuds in a specific compass orientation with the companion information handling system provides the earbud relative mapping system or IHS relative mapping system with a known orientation of the earbuds for use in triangulation, trilateration, or multilateration to determine a distance and angular direction in some embodiments. However, even if the user is not aligned in a magnetic north-south field, the user will still be capable of being directed to find the companion information handling system. It is contemplated in the present specification that any earbud fixed compass orientation may be used such that a user is to be aligned in any assigned alignment direction (e.g., N, E, or W as a front direction).

Where the user and the earbud fixed compass orientation is not aligned along a magnetic north-south field of the earth according to a designated alignment direction at block 430, the method proceeds to block 435. At block 435, the method 400 includes receiving, from the companion information handling system, audio messages instructing the user to change orientation until each earbud has an earbud fixed compass orientation that orients each earbud with the designated alignment direction such as north behind the user along this magnetic north-south field of the earth. These audible instructions may include such phrases as "turn left about 35 degrees" or "turn to face three o'clock" for example. Once the user's fixed orientation matches a magnetic north-south orientation, the method continues to block 440 as described herein.

Where the user is aligned via the designated alignment direction along a magnetic north-south field of the earth at block 430, the method proceeds to block 440. The method 400 includes, at block 440, with receiving, from the companion information handling system, audio messages instructing the user to move forward a distance in order to determine if the companion information handling system is in front of or behind the earbuds and user. During this process, the earbuds may be detecting HADM data to determine whether the user has moved closer to the companion information handling system or further away from the companion information handling system. As described herein, the HADM system may be a feature of the Bluetooth communication systems within the first earbud and second earbud that each use time-of-flight (ToF) data to determine a distance between the first earbud and second earbud, individually, to a signal source such as the companion information handling system. ToF data includes measurements of the time taken for a data packet (e.g., a ping) to be transmitted to or from each of the first earbud and second earbud to the companion information handling system. Because the time of flight is known as well as the speed of the transmission of the data packets (e.g., speed of light), the distance between the first earbud and second earbud to the companion information handling system may be calculated by the first earbud processor and second earbud processor to produce the HADM data for distance to the companion information handling system.

The method 400 includes, at block 445 at FIG. 4B, determining if the user has been detected as moving closer to the companion information handling system as the user makes those steps at block 440. Block 440 of FIG. 4A and 445 of FIG. 4B are connected via an encircled "A" on both FIGS. 4A and 4B. The microcontroller in one or more earbuds will send the HADM signals and compare the distance determination with previous HADM signals to determine an increase or decrease in distance to the companion information handling system relative to the previous distance determination. Where the user is detected as moving closer to the companion information handling system at block 445, the method proceed to block 450. At block 450, the method 400 further includes the earbuds receiving audio input from the companion information handling system that the companion information handling system is a distance in front of the user and to turn left or right. These audible instructions provided at the earbuds may be dependent on the discovered relative location of the first earbud and second earbud to the companion information handling system and the user may be directed to move right or left because the user has moved toward the companion information handling system. Other audible instructions may include instructions to move further forward a certain number of steps, move left or right a certain number of steps, among other series of instructions. In an embodiment, further audible instructions may include a notice of how far away the user is from the information handling system relative mapping system. Each of these instructions are presented to the user via the first earbud speaker and second earbud speaker as described herein.

The method 400 includes a determination of whether the companion information handling system has been found at block 455. As described herein, in an embodiment, if the user has found the companion information handling system, the user may provide input at a graphical user interface (GUI) presented on a video display device of the companion information handling system or an earbud input, such as a touchpad input on the earbuds to indicate that the user has found the companion information handling system. Without this input, the companion information handling system may determine that the companion information handling system has not been found and the method 400 returns to block 450 with additional HADM transmission and companion information handling system location determination until the user has found the companion information handling system. Where the user has found the companion information handling system (e.g., provided input via the video display device), the method 400 continues to block 460 with the processing device of the companion information handling system shutting down the relative mapping system at companion information handling system and HADM system at earbuds. In an embodiment, the HADM system at the earbuds may be shut down so that the battery power of the earbuds may be conserved.

The method 400 further includes, at block 480, determining if the earbuds are still initiated. Where the earbuds are still operating, the method 400 may return to block 410 at FIG. 4A (e.g., as designated with an encircled "B") with monitoring for the user providing input to activate the relative mapping system on the earbuds as described herein. Where the earbuds have been shut down (e.g., put away in a charging station or disconnected from the wireless connection at the companion information handling system), the method 400 may end.

In an embodiment, returning to block 445 where the user has not moved closer to or is determined to move farther from the companion information handling system by taking a number of steps forward at block 440, the method 400 may proceed to block 465. At block 465, the earbuds may receive audio input from the companion information handling system that the companion information handling system is a distance behind the user along with other audible instructions to, for example, turn left or right, in order to find the companion information handling system.

The method 400 includes a determination of whether the companion information handling system has been found at block 470. As described herein, in an embodiment, if the user has found the companion information handling system, the user may provide input at a graphical user interface (GUI) presented on a video display device of the companion information handling system or an earbud input such as a touch on a touchpad of one or both earbuds to indicate that the user has found the companion information handling system. Without this input, the companion information handling system may determine that the companion information handling system has not been found and the method 400 returns to block 465 with additional HADM transmission for angular direction and distance measurements of location of the companion information handling system until the user has found the companion information handling system. Where the user has found the companion information handling system (e.g., provided input via the video display device), the method 400 continues to block 470 with the processing device of the companion information handling system shutting down the relative mapping system at companion information handling system and HADM system at earbuds. In an embodiment, the HADM system at the earbuds may be shut down so that the battery power of the earbuds may be conserved.

The method 400 further includes, at block 480, determining if the earbuds are still initiated. Where the earbuds are still operating, the method 400 may return to block 410 with monitoring for the user providing input to activate the relative mapping system on the earbuds as described herein. Where the earbuds have been shut down (e.g., put away in a charging station or disconnected from the wireless connection at the companion information handling system), the method 400 may end.

Figure 5A:
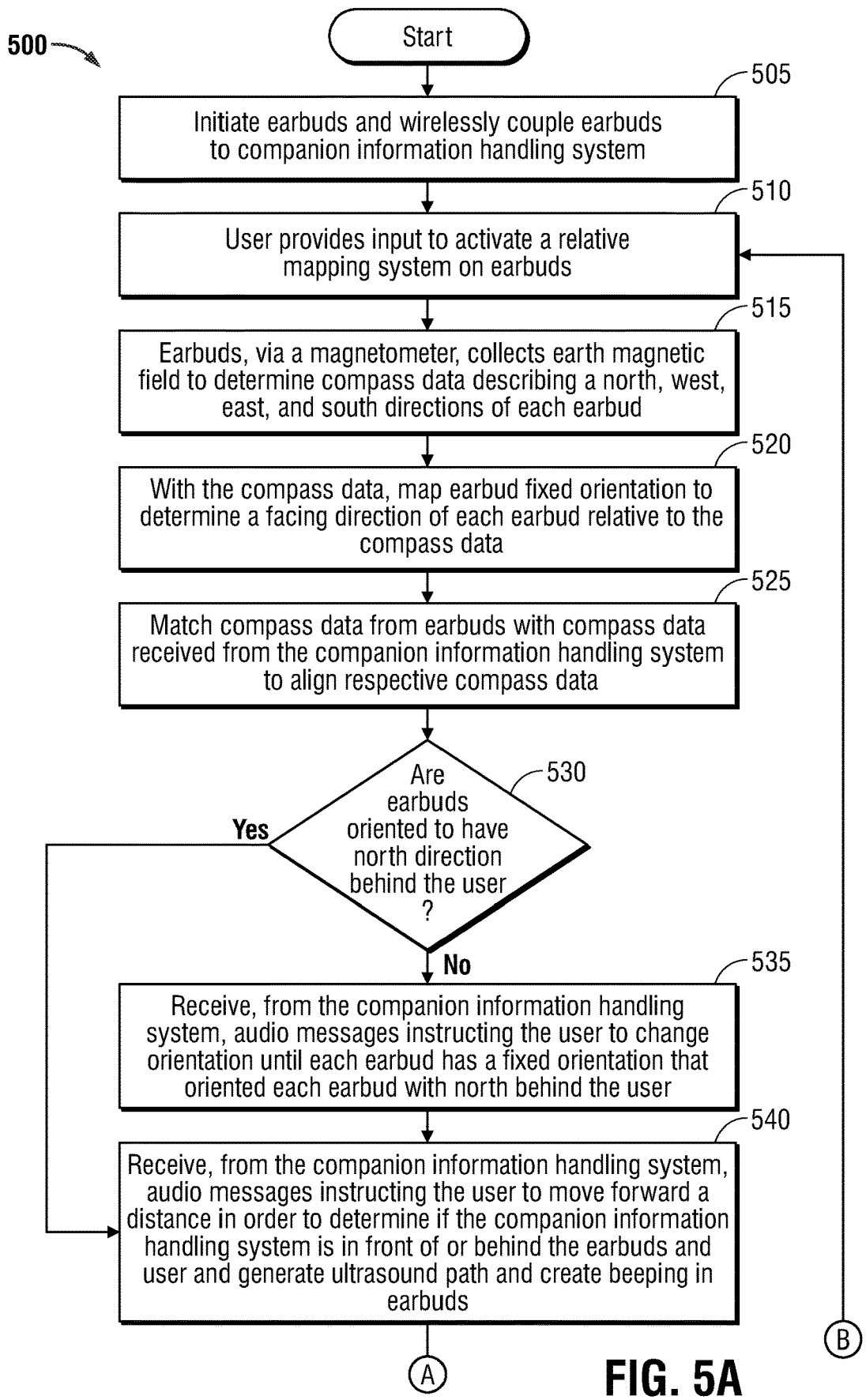
FIG. 5A is a first portion of a flow diagram of a method of using a magnetometer, a fixed earbud orientation, and ultrasound to provide instructions to a user to find a companion information handling system according to an embodiment of the present disclosure.
Figure 5B:
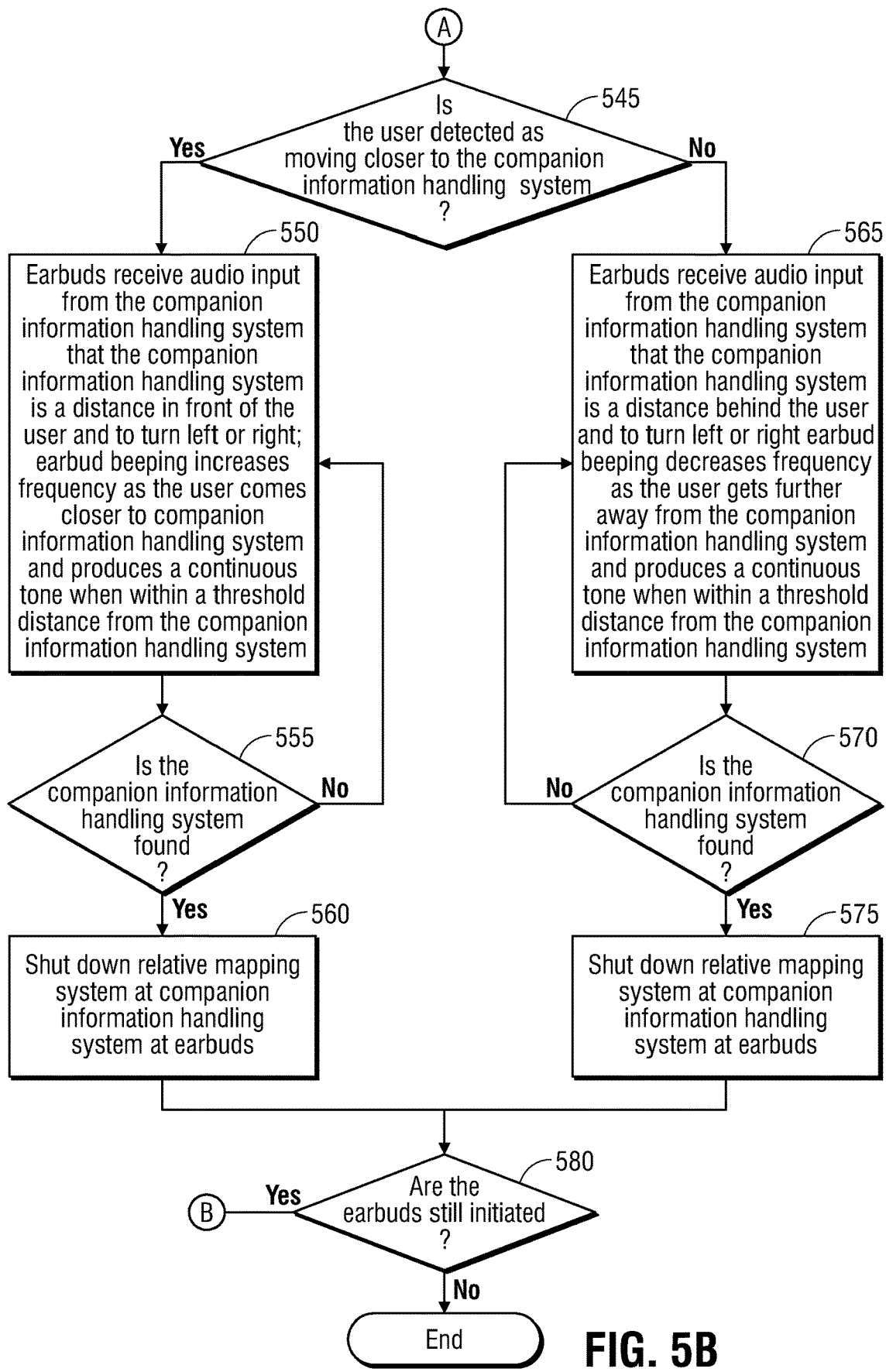
FIG. 5B is a second portion of a flow diagram of a method of using a magnetometer, a fixed earbud orientation, and ultrasound to provide instructions to a user to find a companion information handling system according to another embodiment of the present disclosure.

FIG. 5A is first portion of a flow diagram of a method 500 of using a magnetometer, an earbud fixed compass orientation, and ultrasound to provide instructions to a user to find a companion information handling system according to an embodiment of the present disclosure. FIG. 5B is a second portion of a flow diagram of a method of using a magnetometer, a fixed earbud orientation, and ultrasound to provide instructions to a user to find a companion information handling system according to another embodiment of the present disclosure. The method 500 described in FIG. 5 uses a magnetometer, a detected earbud fixed compass orientation, and ultrasonic sounds emitted from the first earbud and second earbud, as well as a BT wireless link in order to determine angular direction and distance of a companion information handling system and provide audible instructions to the user to find a lost companion information handling system. The earbuds may execute code instructions of an earbud relative mapping system and the companion information handling system may execute code instructions of an information handling system (IHS) relative mapping system to perform any portion of the steps of FIGS. 5A and 5B or operate in coordination to perform any or most steps according to various embodiments herein. For purposes of ease of discussion, FIGS. 5A and 5B is described in parts where particular steps are performed by earbud relative mapping system and the IHS relative mapping system, but it is contemplated that any step, particularly for determining angular directions or distances, may be performed by either, according to embodiments of the present disclosure.

The method 500 may begin, at block 505 of FIG. 5A, with the user initiating the earbuds and wirelessly coupling the earbuds to the companion information handling system. As described herein, the wireless coupling of the pair of earbuds to the companion information handling system is accomplished through the activation of a wireless radio in each of the pair of earbuds and companion information handling system and transmitting data over that wireless connection. At this point, the user, in the example scenario, is listening to music via this wireless connection or otherwise occupied and has noticed that the user has lost sight of the companion information handling system.

The method 500 includes, at block 510, the user providing input to activate the relative mapping system at the pair of earbuds. In an embodiment, this input may include concurrently actuating a touch pad on each of the first earbud and second earbud. This may include the user touching the touch pad on the first earbud and second earbud for a set duration of time. However, the present specification contemplates that other input may be used to activate the earbud relative mapping system as described herein. For example, the pair of earbuds may be capable of receiving verbal commands from the user and the user may provide verbal input (e.g., "activate earbud relative mapping system" or "find my phone") to activate the earbud relative mapping system. Still further, dedicated hard buttons may be provided on the pair of earbuds that, when actuated by the use, causes the earbud relative mapping system to be executed by the processor(s) of the pair of earbuds.

At block 515, the earbuds may each detect, with a magnetometer, the earth's magnetic field to determine compass data describing a north, west, east, and south directions of each earbud. In an embodiment, the detection of the earth's magnetic field may be conducted as a result of a request from a companion information handling system to get compass data from the pair of earbuds by the companion information handling system. The request may be done via a wireless Bluetooth® connection established by the companion information handling system with the pair of earbuds.

At block 520, the method includes mapping an earbud fixed compass orientation to determine a facing direction of each earbud relative to the compass data for earth's magnetic compass using the compass data obtained from the magnetometer. This earbud fixed compass orientation may be a direction that the user is facing and may, in some embodiments, not be aligned with a designated alignment direction with a north-south direction of the earth's magnetic field. The mapping of this compass data determines the facing direction of the user relative to the earth's magnetic field.

After this mapping at block 520, the method includes, at block 525, matching compass data from the earbuds with compass data received from the companion information handling system to align respective compass data. This allows the respective compass data from each of the earbuds and the companion information handling system to be mapped relative to each other.

The method 500 further includes determining, at block 530, whether each earbud is oriented to have a north direction by the user. In some example scenarios, the fixed orientation of the earbuds may align north to south with the user's face facing south and the user's back facing north as a designated alignment direction. It is contemplated that any alignment direction may be designated for the earbud in various embodiments. This alignment of the user with the magnetic north-south field of the earth may, in some embodiments, increase the efficiency of finding the companion information handling system. However, even if the user is not aligned in a magnetic north-south field, and instead aligned in other orientations (e.g., east-west magnetic orientation) the user will still be capable of being directed to find the companion information handling system in some embodiments.

Where the user is not aligned at the designated alignment direction along a magnetic north-south field of the earth at block 530, the method 500 includes receiving, from the companion information handling system, audio messages instructing the user to change orientation until each earbud has an earbud fixed compass orientation that orients each earbud with the designated alignment direction such as north behind the user along this magnetic north-south field of the earth in an example embodiment. These audible instructions may include such phrases as "turn left about 35 degrees" or "turn to face three o'clock" for example. Once the user's fixed orientation matches a magnetic north-south orientation, the method continues to block 540 as described herein. Where the user is aligned along a magnetic north-south field of the earth at block 530, the method will proceed directly to block 540 in an embodiment.

At block 540, the earbuds receive, from the companion information handling system, audio messages instructing the user to move forward a distance in order to determine if the companion information handling system is in front of or behind the earbuds and user. In an embodiment, the earbuds may detect an ultrasonic noise emitted from a speaker of the companion information handling system. The path of the ultrasonic sounds may be described as an ultrasonic path that is received, independently, by a microphone at each of the first earbud (e.g., a right earbud) and a second earbud (e.g., a left earbud). Similar to the HADM data described in connection with FIG. 4, this ultrasonic noise allows each of the earbuds to determine a distance between the first earbud and second earbud, individually, to the signal source: the companion information handling system. As the ultrasonic sound is received and due to the different distances that the first earbud and second earbud are away from the companion information handling system, each of the first earbud and second earbud receive this ultrasonic sound at their microphones at different times. The distance between the first earbud and the companion information handling system, for example, is defined by the time the ultrasonic sound is sent by the companion information handling system and received by the first earbud. With the known speed of sound, the distance between the first earbud and the companion information handling system may be determined. A similar calculation may be made for the second earbud as well in order to determine the distance between the second earbud and the companion information handling system. The difference in the length of the ultrasonic sound path allows the first earbud and second earbud, after comparing receiving times, to triangulate, trilaterate, or multilaterate the position of the companion information handling system relative to the earbuds and the user. The distance data may be sent back to the companion information handling system when calculated by each of the processing devices in the earbuds for the companion information handling system to triangulate, trilaterate, or multilaterate to position of each earbud, in an embodiment. In an embodiment, because the distances between each of the earbuds and the companion information handling system has been determined along with an estimated distance between the first earbud and second earbud (e.g., average width of a user's head), the relative position of the first earbud and second earbud to the companion information handling system can be calculated. In an embodiment, a feedback loop may be conducted in real time and repeatedly with the Bluetooth® radio by sending the time of receipt of the ultrasonic sound and compares those times with the time the companion information handling system had sent out the ultrasonic sound. This may generate a distance measurement between the earbuds and the companion information handling system.

The method 500 includes, at block 545, determining if the user has been detected as moving closer to the companion information handling system as the user makes those steps at block 540. Block 540 of FIG. 5A and 545 of FIG. 5B are connected via an encircled "A" on both FIGS. 5A and 5B. The microcontroller in one or more earbuds will determine the receipt time of the ultrasonic noise and compare the distance determination with previous ultrasonic noise calculations made, in an example embodiment, at block 540, to determine an increase or decrease in distance from each of the first earbud and a second earbud to the companion information handling system. Where the user is detected as moving closer to the companion information handling system at block 545, the method proceeds to block 550. At block 550, the method 500 further includes the earbuds receiving audio input from the companion information handling system that the companion information handling system is a distance in front of the user and to turn left or right. These audible instructions provided at the earbuds may be dependent on the discovered relative location of the first earbud and second earbud to the companion information handling system and the user may be directed to move right or left because the user has moved toward the companion information handling system. Other audible instructions may include instructions to move further forward a certain number of steps, move left or right a certain number of steps, among other series of instructions. In an embodiment, further audible instructions may include a notice of how far away the user is from the information handling system relative mapping system. Each of these instructions are presented to the user via the first earbud speaker and second earbud speaker as described herein.

Still further, at block 550, the earbuds may use an audible beeping noise to tell the user if the user is coming closer to or moving further away from the companion information handling system. In an embodiment, the earbud beeping increases frequency as the user comes closer to companion information handling system and produces a continuous tone when within a threshold distance from the companion information handling system.

The method 500 includes a determination of whether the companion information handling system has been found at block 555. As described herein, in an embodiment, if the user has found the companion information handling system, the user may provide input at a graphical user interface (GUI) presented on a video display device of the companion information handling system or an earbud input, such as a touchpad input on the earbuds to indicate that the user has found the companion information handling system. Without this input, the companion information handling system may determine that the companion information handling system has not been found and the method 500 returns to block 550 with additional ultrasonic noise transmissions from the companion information handling system with a companion information handling system location determination until the user has found the companion information handling system. Where the user has found the companion information handling system (e.g., provided input via the video display device), the method 500 continues to block 560 with the processing device of the companion information handling system shutting down the relative mapping system at companion information handling system and stop sending the ultrasonic sound signals to the earbuds.

The method 500 further includes, at block 580, determining if the earbuds are still initiated. Where the earbuds are still operating, the method 500 may return to block 510 at FIG. 5A (e.g., as designated with an encircled "B") with monitoring for the user providing input to activate the relative mapping system on the earbuds as described herein. Where the earbuds have been shut down (e.g., put away in a charging station or disconnected from the wireless connection at the companion information handling system), the method 500 may end.

In an embodiment, returning to block 545 where the user has not moved closer to or is determined to move farther away from the companion information handling system by taking a number of steps forward at block 540, the method 500 may proceed to block 565. At block 565, the earbuds may receive audio input from the companion information handling system that the companion information handling system is a distance behind the user along with other audible instructions to, for example, turn left or right, in order to find the companion information handling system. In this embodiment, the earbud beeping decreases frequency as the user is detected as moving further away from the companion information handling system. Other audio instructions may be provided for the user to turn around whereupon the frequency of the beeping increases (e.g., the orientation of the user is now with the user facing the companion information handling system) and produces a continuous tone when within a threshold distance from the companion information handling system. Again, the ultrasonic distance measurements described herein may be continuously used to determine a distance and, accordingly, the frequency of beeping at the earbuds may be changed while directing the user towards the companion information handling system.

The method 500 includes a determination of whether the companion information handling system has been found at block 570. As described herein, in an embodiment, if the user has found the companion information handling system, the user may provide input at a graphical user interface (GUI) presented on a video display device of the companion information handling system or an earbud input such as a touch on a touchpad of one or both earbuds to indicate that the user has found the companion information handling system. Without this input, the companion information handling system may determine that the companion information handling system has not been found and the method 500 returns to block 565 with additionally ultrasonic sound signals emitted from the speaker of the companion information handling system for angular direction and distance measurements of location of the companion information handling system until the user has found the companion information handling system. Where the user has found the companion information handling system (e.g., provided input via the video display device), the method 500 continues to block 575 with the processing device of the companion information handling system shutting down the relative mapping system at companion information handling system and stop the transmission of ultrasonic sound signals to the earbuds.

The method 500 further includes, at block 580, determining if the earbuds are still initiated. Where the earbuds are still operating, the method 500 may return to block 510 with monitoring for the user providing input to activate the relative mapping system on the earbuds as described herein. Where the earbuds have been shut down (e.g., put away in a charging station or disconnected from the wireless connection at the companion information handling system), the method 500 may end.

Figure 6:
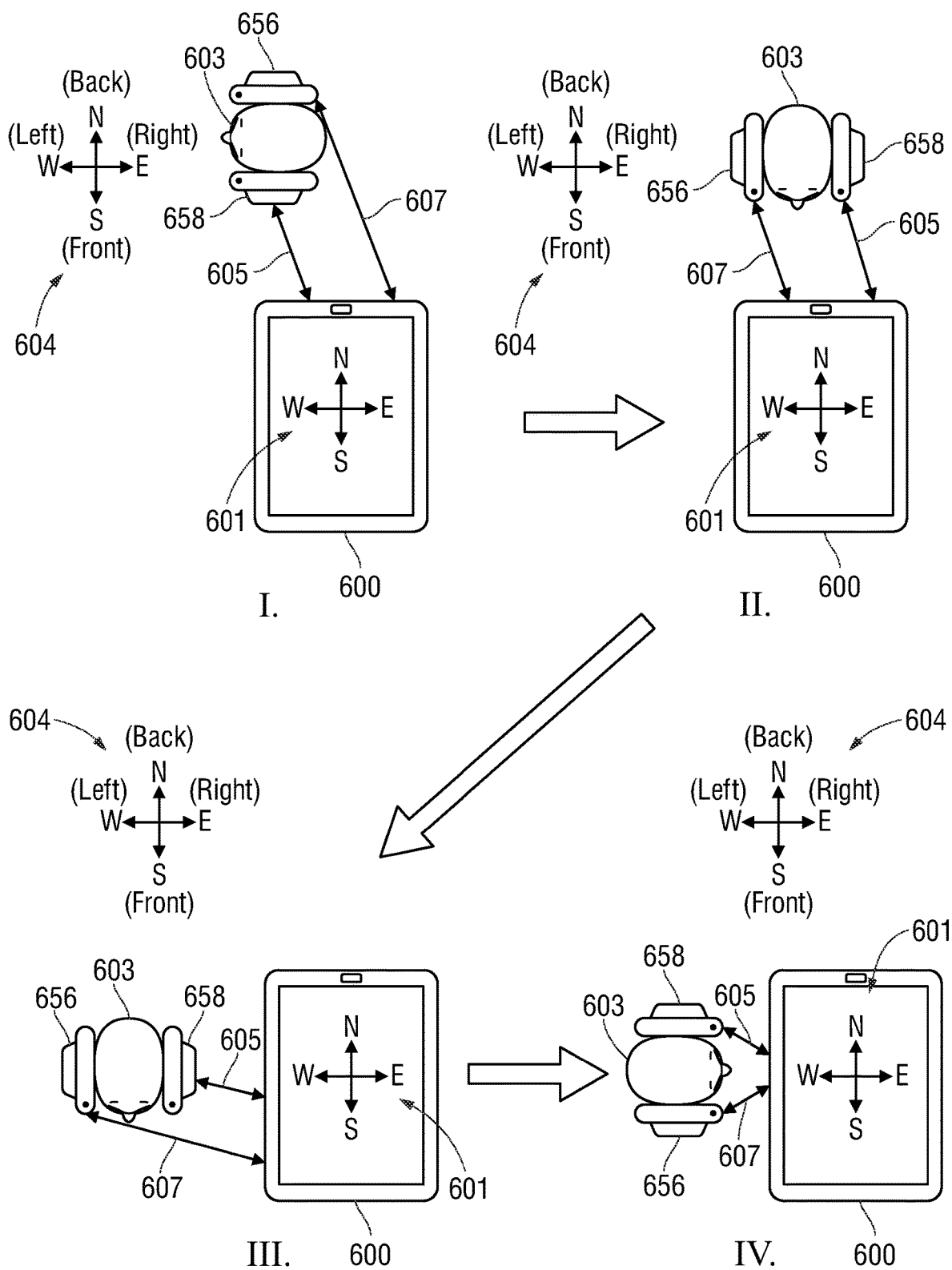
FIG. 6 is series graphic diagram showing a progression of a user being instructed to find a companion information handling system via earbuds when the companion information handling system is behind the user according to an embodiment of the present disclosure.

FIG. 6 is a series of diagrams (I through IV) showing a progression of a user 603 being instructed to find a companion information handling system 600 via earbuds 656, 658 when the companion information handling system 600 is behind the user according to an embodiment of the present disclosure. As described herein, the user has operatively coupled the first earbud 656 (e.g., a right earbud) and a second earbud 658 (e.g., a left earbud) to the companion information handling system 600 via a Bluetooth® wireless connection allowing the user to, for example, listen to music, a podcast, or other audio provided wirelessly to the earbuds 656, 658. In an embodiment, one of the first earbud 656 and second earbud 658 may act as a principal earbud that controls or coordinates the communication of the earbuds with the companion information handling system 600 while the other earbud is acts as an agent earbud that communicates only with the principal earbud. In another embodiment, each of the first earbud 656 and second earbud 658 may communicate with the companion information handling system 600 independently of each other as well as communicate, when necessary, with each other.

FIG. 6 shows a first diagram (I) at the very left showing a user who has activated the earbud relative mapping system. The user may then initiate the earbud relative mapping system to find the companion information handling system 600 by providing input to one or both of the first earbud 656 and second earbud 658. In an embodiment, this input may include concurrently actuating a touch pad on each of the first earbud 656 and second earbud 658. This may include the user touching the touch pad on the first earbud 656 and second earbud 658 for a set duration of time. When the earbud relative mapping system is activated by the user, the first earbud 656 and/or second earbud 658 may send an event code to the companion information handling system 600 to find the companion information handling system 600. This "find companion information handling system 600" event code is received by the companion information handling system 600 wirelessly and launches, in an embodiment, its own information handling system relative mapping system. Among other actions, the execution of the information handling system relative mapping system by, for example, the processor may cause the companion information handling system 600 to ring and/or vibrate (e.g., provide haptic feedback) for the user to hear.

However, this ringing and vibration of the companion information handling system 600 may not help the user to find the companion information handling system 600 especially where the user is currently wearing the first earbud 656 and the second earbud 658, but the companion information handling system is still not visible to or heard by the user. The earbud relative mapping system and/or information handling system relative mapping system, or a combination thereof, may direct a user towards the companion information handling system 600 for the user 603 to find the companion information handling system 600.

The execution of the information handling system relative mapping system by the processor of the companion information handling system 600 may further cause the companion information handling system 600 to determine a compass orientation 601 of the companion information handling system 600 relative to the earth's magnetic field. In this embodiment, a magnetometer of the companion information handling system 600 may measure the earth's magnetic field, determine a north direction, a south direction, an east direction, and a west direction and compile this compass orientation data 601 that defines the orientation of the companion information handling system 600 relative to the earth's magnetic field. This companion information handling system 600 compass orientation data 601 may be used to establish a known orientation of the earbuds 656, 658 relative to the companion information handling system 600 later to direct the user 603, as depicted in FIG. 6, via the first earbud 656 and second earbud 658, to the companion information handling system 600.

The companion information handling system 600 may further execute the information handling system relative mapping system by the processor to request and receive similar earbud compass data to the earth's magnetic field from the first earbud 656 and the second earbud 658 and as earbud fixed compass orientation 604 with a designated alignment direction relative to that earbud compass data. The first earbud 656 and/or second earbud 658, in an embodiment, includes an earbud processor, an earbud memory device, and an earbud accelerometer with a first or second earbud magnetometer to gather this compass data. The execution of the earbud relative mapping system by both the first earbud 656 and second earbud 658 by their respective processors causes the first earbud 656 and second earbud 658 to determine a north direction, a south direction, an east direction, and a west direction and compile this earbud compass data that defines the orientation of each of the first earbud 656 and second earbud 658 relative to the earth's magnetic field. In the example shown in FIG. 6, the user may be facing west initially. This earbud compass data and as earbud fixed compass orientation 604 with a designated alignment direction relative to that earbud compass data may be used later to direct the user, via the first earbud 656 and second earbud 658, to the companion information handling system 600. This earbud compass data and as earbud fixed compass orientation 604 with a designated alignment direction relative to that earbud compass data may be sent to the companion information handling system 600 along wireless transmissions 607 and 605, respectively.

The earbud relative mapping system and/or companion information handling system 600 may then initiate audible instructions to be received at the first earbud 656 and second earbud 658 in order to direct the user 603 to the companion information handling system 600 as described herein. In the embodiment shown in the next diagram in FIG. 6, the first instruction may include directing a user to turn until the user is facing a designated alignment direction (e.g., a southernly direction and along a north-south magnetic field of the earth). Then the wireless connections 605 and 607 may be used to update, in real-time, the HADM data or ultrasonic data and compass data with the companion information handling system 600 to inform the companion information handling system 600 whether the instructions were properly carried out by the user. In this way, the earbud relative mapping system and/or information handling system relative mapping system may know the orientation of the two earbuds 656, 658 relative to each earbud and the companion information handling system, and may have a known distance or measured distance between the two earbuds 656, 658.

In an embodiment, the execution of the information handling system relative mapping system by the processor may further send a request to the first earbud 656 and second earbud 658 for the first earbud 656 and second earbud 658 to activate their respective HADM system or ultrasonic distance system as described herein. This HADM data may be sent as an HADM signal or ultrasonic data sent as an ultrasonic signal from each of the first earbud 656 and second earbud 658 to the companion information handling system 600 as requested along wireless transmissions or ultrasonic paths 607 and 605, respectively.

In an embodiment, the execution of the information handling system relative mapping system by the processor may transmit an ultrasonic sound signal from an ultrasonic distance system to be detected by microphones on each of the earbuds 656, 658. This ultrasonic sound signal may be sent from a speaker on the companion information handling system at any time for the distance of the first earbud 656 and second earbud 658 relative to the companion information handling system 600 to be calculated.

When the companion information handling system 600 has received the compass data and HADM signal data from each of the first earbud 656 and second earbud 658 or vice-versa, the execution of the earbud relative mapping system and/or information handling system relative mapping system may continue with calculating a first distance between the first earbud 656 and the companion information handling system 600 and a second distance between the second earbud 658 and the companion information handling system 600. Alternatively, the execution of the earbud relative mapping system and/or information handling system relative mapping system may continue with calculating a first distance between the first earbud 656 and the companion information handling system 600 and a second distance between the second earbud 658 and the companion information handling system 600 via the ultrasonic sound signal receipt times from the earbuds 656, 658. The difference between the first distance and the second distance is also calculated to determine the relative distances of each of the first earbud 656 and second earbud 658 relative to the companion information handling system 600. Because, in an example embodiment, the first earbud 656 is a right ear earbud and the second earbud 658 is a left ear earbud and the earbud fixed compass orientation is aligned with the designated alignment direction, the calculated difference between the first distance and second distance allows the companion information handling system 600 to know in which direction the user is facing as well as the position of both the first earbud 656 and second earbud 658 in the known earbud fixed compass orientation relative to the companion information handling system 600 (e.g., to the left of the companion information handling system 600 or to the right of the companion information handling system 600). In the second leftmost diagram (II) in FIG. 6, the earbuds are in a known earbud fixed compass orientation relative to the designated alignment direction and the second earbud 658 is closer to the companion information handling system 600 than the first earbud 656. The HADM data received from HADM signals from these earbuds 656, 658 would indicate as much. Additionally, the earbud compass data from each of the earbuds 656, 658 indicates a direction the user is facing based on the magnetometer data indicating that the user is now facing the designated alignment direction (e.g., south) along a north-south magnetic field of the earth.

With the orientation of the user 603 changed to a north-south magnetic field orientation, the next diagram shows the instructions from the companion information handling system 600 instructing the user to move forward a number of steps (e.g., 3 steps). In this example embodiment at (III), the user has moved closer to the companion information handling system 600 but the companion information handling system 600 is still to the left of the user 603. In an embodiment, a set of HADM signals or ultrasonic signals are used to obtain new distances (and directions) of the earbuds via the execution of the information handling system relative mapping system. Older HADM data or ultrasonic data is compared to newer HADM data or newer ultrasonic sound signal data to determine if the user 603 is closer to the companion information handling system and the companion information handling system is to the front or side of the user having moved closer. In the shown example embodiments, the companion information handling system 600 was in front of the user at diagram II and is to the user's 603 left in diagram III for example having moved forward. Without the user finding the companion information handling system 600, further instructions may be necessary to direct the user to the companion information handling system 600. In the last diagram of FIG. 6 at (IV) this happens when the companion information handling system 600 provides instructions after the user has turned left that the companion information handling system 600 is in front of the user 603 at a distance determined from additional HADM signals or ultrasonic sound signals.

Although, the series of diagrams (I. II. III. IV) show and have been described as providing specific instructions, it is appreciated that other instructions may be used to direct the user such as specific indications that relate the distance of the user 603 and the earbuds 656, 658 relative to the companion information handling system 600. Additionally, in an embodiment, instead of instructing the user to turn left or right, the instructions may direct the user to turn a certain direction based on a clock face (e.g., "turn to a 3 o'clock position"). Where the user has found the companion information handling system 600 (e.g., provided input via the video display device), the processing device of the companion information handling system may shut down the relative mapping system at companion information handling system and HADM system at earbuds. In an embodiment, the HADM system at the earbuds may be shut down so that the battery power of the earbuds may be conserved.

Figure 7:
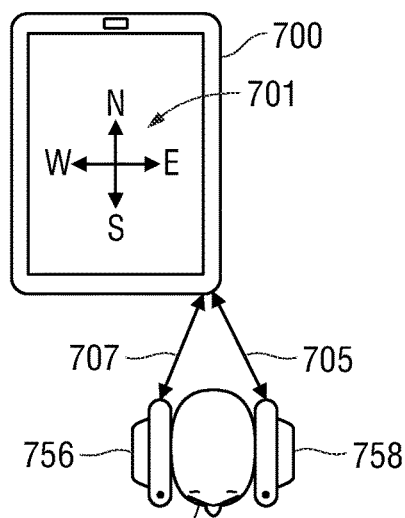
FIG. 7 is series graphic diagram showing a progression of a user being instructed to find a companion information handling system via earbuds when the companion information handling system is behind the user according to another embodiment of the present disclosure.
Figure 7:
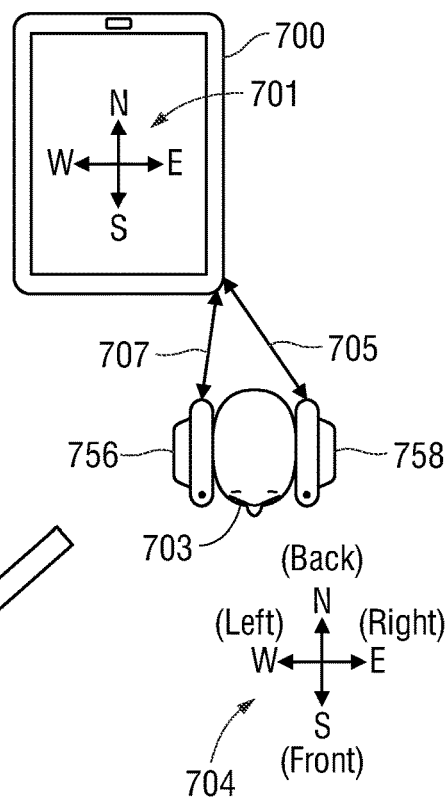
Figure 7:
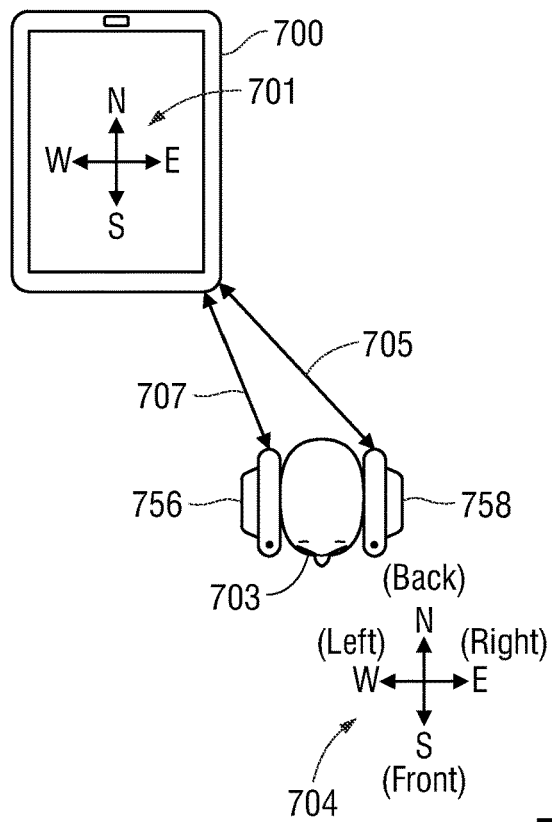
Figure 7:
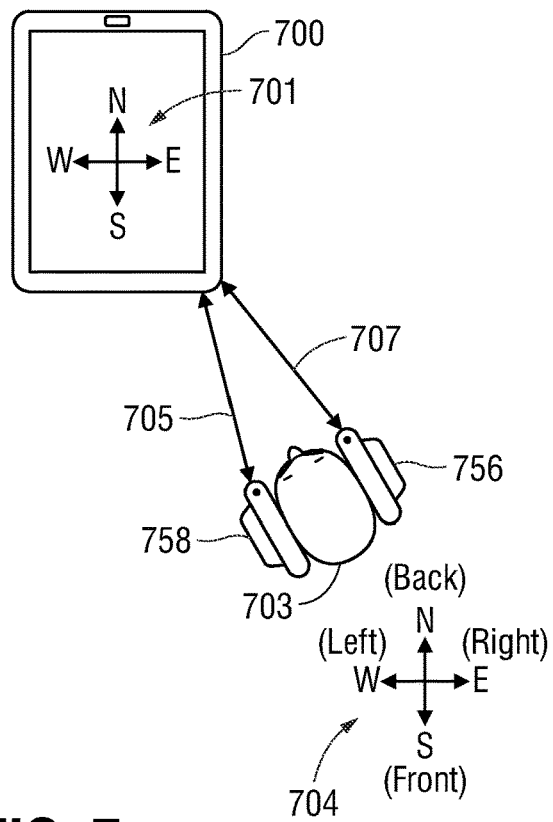

FIG. 7 is a series of diagrams (I through IV) showing a progression of a user 703 being instructed to find a companion information handling system 700 via earbuds when the companion information handling system 700 is behind the user according to another embodiment of the present disclosure. For convenience of explanation, the present diagram assumes the that requests for and provisioning of the earbud compass data and fixed earbud compass orientation relative to a designated alignment direction 704 and HADM signal data or ultrasonic signals (e.g., along wireless connections 707 and 705) from the first earbud 756 and second earbud 758 has been completed between diagrams (I) and (II) and the companion information handling system 700 is left to direct the user to the companion information handling system 700 based on the calculations described herein.

At a first diagram (I) in FIG. 7, the user is determined to be facing south along a north-south magnetic field according to the compass data received at the relative mapping system at the companion information handling system 700. In this example, embodiment at the first diagram (I), the user is already aligned in a north-south direction of the earbud fixed compass orientation with a designated alignment direction, in the shown embodiment south as front, with the information handling system compass data 701 of the companion information handling system 700. In this case the earbud relative mapping system and/or IHS relative mapping system does not need to instruct the user, via the earbuds, to turn to align the user 703 with this designated direction.

Upon determination at diagram (II) that the user is already aligned with the earbud fixed compass orientation, the HADM signal data or ultrasonic signal data may be used to determine a distance from the user 703 with earbuds 756, 758 to the companion information handling system 700. The next diagram (III) in FIG. 7 shows the user being instructed to step forward a number of steps (e.g., 3) with the earbud relative mapping system and/or IHS relative mapping system detecting whether the user is moving closer to the companion information handling system 700 or further away. Because the user is facing south and the companion information handling system 700 is in a northern direction from, or behind the user, any movement forward by the user 703 puts the user at a farther position away from the companion information handling system 700. The companion information handling system 700 can detect this via a new HADM signal data sent from the first earbud 756 via the first wireless path 707 and sent from the second earbud 758 via the second wireless path 705. Alternatively, the companion information handling system 700 will know that the user 703 has stepped away via the use of a new ultrasonic sound signals produced by the speakers of the companion information handling system 700 or earbuds 756, 758 and received at the microphones of the first earbud 756 and second earbud 758 or companion information handling system 700 as described herein via ultrasonic path 707 or 705 in another embodiment. The earbud relative mapping system and/or IHS relative mapping system may determine from distance from the old HADM signals or ultrasonic signals as compared to the distances from the new HADM signals or ultrasonic signals that the distance to the companion information handling system 700 has increased and that the companion information handling system 700 is behind the user 703.

In the next diagram (III) the companion information handling system 700 may provide an audible instruction that the companion information handling system 700 is a certain distance (e.g., 7 meters) behind the user. At the third diagram (III), the user may be instructed to "turn around" (e.g., turn 180° around). This instruction may further include a direction that the companion information handling system 700 is behind the user, in this example embodiment, and to the user's 703 right before turning around (or left upon turning around depending on the situation). The user 703 may be instructed to turn with the instructions from the companion information handling system 700 or earbuds 756, 758.

The HADM system or ultrasonic distance system then utilize one or more additional HADM signals or ultrasonic signals at diagram (IV) to determine a distance and direction, which is then updated so that the user is directed to the companion information handling system 700. When this occurs, the earbud relative mapping system and/or IHS relative mapping system may again triangulate, trilaterate, or multilaterate the location of the companion information handling system 700 relative to both the first earbud 756 and second earbud 758 via the additional HADM signal data or the ultrasonic sound signals as described herein to determine the newest location. Additional instructions such as "move forward 7 meters" or "move forward and left 3 meters" or another instruction relating to the distance and direction of the companion information handling system 700 may be provided until the user has reached the location of the companion information handling system 700. In an embodiment, the companion information handling system 700 may provide a beeping noise to the user 703 via the earbuds 756, 758 where a high frequency beeping noise tells the user 703 that the user 703 is close to the companion information handling system 700 and a low frequency beeping noise tells the user 7003 that the user 703 is further away from the companion information handling system 700.

Again, where the user has found the companion information handling system 700 (e.g., provided input via the video display device), the processing device of the companion information handling system 700 may shut down the relative mapping system at companion information handling system and HADM system at earbuds or the ultrasonic sound signals produced by the speakers of the companion information handling system 700. In an embodiment, the HADM system at the earbuds may be shut down so that the battery power of the earbuds may be conserved.

Figure 8A:
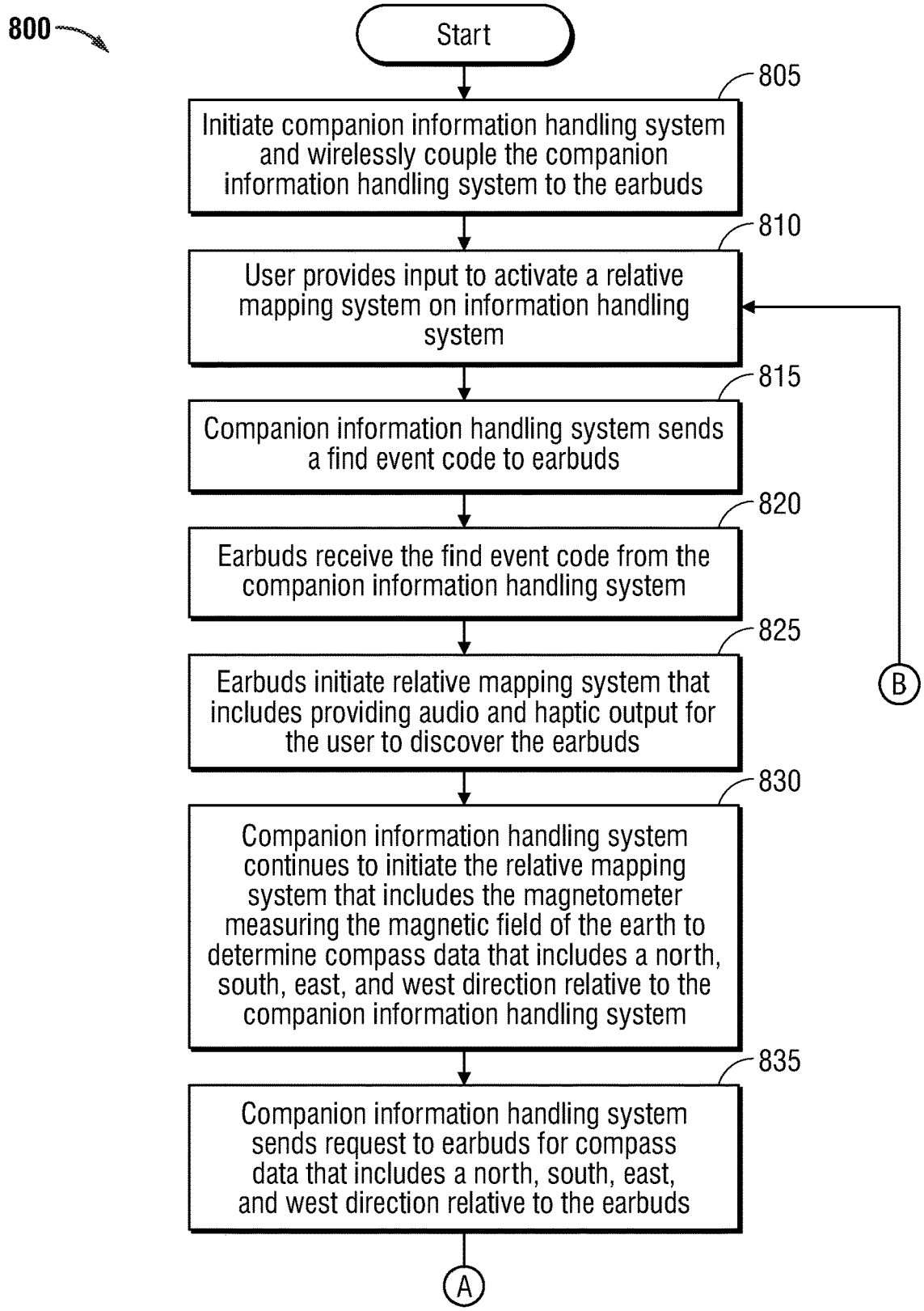
FIG. 8A is a first portion of a flow diagram of a method of locating earbuds with a companion information handling system according to an embodiment of the present disclosure.
Figure 8B:
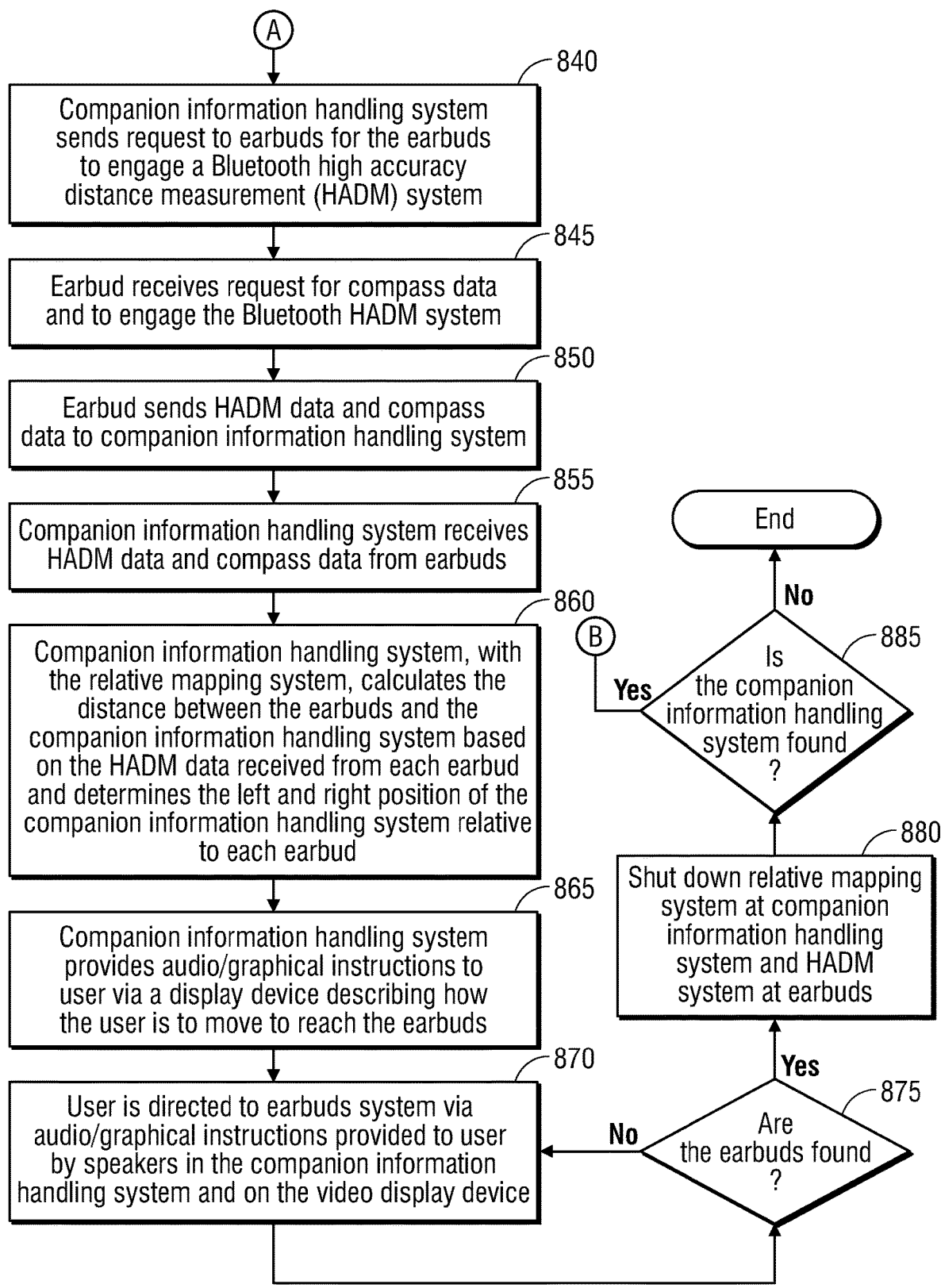
FIG. 8B is a second portion of a flow diagram of a method of locating earbuds with a companion information handling system according to another embodiment of the present disclosure.

FIG. 8A is a first portion of a flow diagram of a method 800 of locating earbuds with a companion information handling system according to an embodiment of the present disclosure. FIG. 8B is a second portion of a flow diagram of a method 800 of locating earbuds with a companion information handling system according to another embodiment of the present disclosure. The method 800 of FIGS. 8A and 8B describes a reverse process than that described in connection with FIGS. 3A and 3B; a process of a user locating a one or both of the earbuds that has been lost via the companion information handling system.

The method 800 may begin, at block 805 of FIG. 8A, with the user initiating the companion information handling system and wirelessly coupling the companion information handling system to a pair of earbuds. As described herein, the wireless coupling of the pair of earbuds to the companion information handling system is accomplished through the activation of a wireless radio in each of the pair of earbuds and companion information handling system and transmitting data over that wireless connection. At this point, the user, in the example scenario, has lost sight of the earbuds and needs to find them.

The method 800 includes, at block 810, the user providing input to activate the relative mapping system at the companion information handling system. In an embodiment, this input may include executing the relative mapping system by actuating (e.g., selecting an icon on a display device of the companion information handling system) a program file so that the processor of the companion information handling system may execute the computer readable program code associated with the relative mapping system. However, the present specification contemplates that other input may be used to activate the relative mapping system as described herein.

At block 815, the method 800 includes the companion information handling system sending a find event code to one or both of the earbuds. This find event code may be sent (e.g., at block 815) and received (e.g., at block 820), wirelessly, at the processing devices of the earbuds. In an embodiment, the find event code may be in the form of a specific request that, at block 825, causes the earbuds to execute the earbud relative mapping systems. The earbud relative mapping systems may, in an example embodiment, immediately cause the earbuds to provide audio and/or haptic output for the user to hear and/or feel the location of the earbuds. Although the user may have lost the earbuds, the earbuds may be within hearing or touch of the user for the user to discover. However, where the lost earbuds are not in a location where the user can hear the audio output from the earbuds, the method continues to block 830.

At block 830, the companion information handling system continues to initiate the relative mapping system that includes the magnetometer of the companion information handling system measuring the magnetic field of the earth to determine compass data that includes a north, south, east, and west direction relative to the companion information handling system. In this embodiment, a magnetometer may be part of an accelerometer of the companion information handling system may measure the earth's magnetic field, determine a north direction, a south direction, an east direction, and a west direction and compile this compass data that defines a fixed compass orientation relative of front, back, left, and right of the companion information handling system relative to the earth's magnetic field. This fixed compass orientation of the companion information handling system may or may not match a designated alignment direction used later to guide the user holding the companion information handling system to the lost earbuds.

The method 800 includes, at block 835, the companion information handling system sending a request to the pair of earbuds for compass data that includes a north, south, east, and west direction relative to the earbuds. As described herein, each of the earbuds includes an accelerometer and magnetometer with the latter being capable of detecting the earth's magnetic field and providing compass data to the companion information handling system as described herein. This request to get compass data from the pair of earbuds by the companion information handling system may be done via a wireless Bluetooth® connection with the pair of earbuds. Additionally, in an embodiment, the receipt of the earbud compass data is done via a wireless Bluetooth® connection.

At block 840, the companion information handling system sends request to earbuds for the earbuds to engage a Bluetooth HADM system that is a feature of the Bluetooth communication protocols. Block 835 of FIG. 8A and 840 of FIG. 8B are connected via an encircled "A" on both FIGS. 8A and 8B. As described herein, the HADM system may be a feature of the Bluetooth® communication systems within the first earbud and second earbud that each use time-of-flight (ToF) data to determine a distance between the first earbud and second earbud, individually, to a signal source such as the companion information handling system. ToF data includes measurements of the time taken for a data packet (e.g., a ping) to be transmitted to or from each of the first earbud and second earbud to the companion information handling system. Because the time of flight is known as well as the speed of the transmission of the data packets (e.g., speed of light), the distance between the first earbud and second earbud to the companion information handling system may be calculated by the first earbud processor and second earbud processor to produce the requested HADM data. In an alternative embodiment, the companion information handling system may implement a speaker in the companion information handling system to send ultrasonic sound signals to the earbuds. Microphones in the earbuds may receive these ultrasonic sound signals and send back to the companion information handling system a timestamp when these ultrasonic sound signals are detected as described herein. For ease of description, the present example embodiment of FIG. 8 will describe the companion information handling system as using the HADM systems of the earbuds, but it is appreciated that the ultrasonic sound signals from the companion information handling system may be used instead of or in addition to the HADM systems.

The method 800 further includes, at block 845, with the earbud receiving the request for the compass data and the instructions to engage the Bluetooth HADM system. Again, the use ToF data by the HADM system to determine a distance between the first earbud and second earbud, individually, to the companion information handling system is calculated by a processing device on at least one of the first earbud or second earbud in an embodiment. ToF data includes measurements of the time taken for a data packet (e.g., a ping) to be transmitted to or from each of the first earbud and second earbud to the companion information handling system. Because the time of flight is known as well as the speed of the transmission of the data packets (e.g., speed of light), the distance between the first earbud and second earbud to the companion information handling system is calculated by the first earbud processor and second earbud processor to produce the requested HADM data. The compass data is created by accessing a magnetometer at the first earbud or second earbud to determine an orientation of the earbuds relative to the earth's magnetic field. In this embodiment, a magnetometer of the earbuds may measure the earth's magnetic field, determine a north direction, a south direction, an east direction, and a west direction and compile this compass data that defines the orientation of each of the earbuds relative to the earth's magnetic field.

At block 850 the HADM data and compass data may be sent from each of the first earbud and second earbud to the companion information handling system as requested. The first earbud and second earbud may also send the compass data to the companion information handling system. At block 860, the companion information handling system receives the HADM and compass data from each of the earbuds and calculates the distance between the earbuds and the companion information handling system based on the HADM data received from each earbud and determines the left and right position of the companion information handling system relative to each earbud. In an embodiment, because the distances between each of the earbuds and the companion information handling system has been determined along with an estimated distance between the first earbud and second earbud (e.g., average width of a user's head), the relative position of the first earbud and second earbud to the companion information handling system can be calculated. As described herein, a user may be oriented in a position where the earbuds are behind the user, in front of the user, to the left of the user, or to the right of the user.

With the HADM data and compass data, at block 865, the companion information handling system provides audio/graphical instructions to user via a display device describing how the user is to move to reach the earbuds. These audio/graphical instructions provided at the companion information handling system by the earbuds may be dependent on the discovered relative location of the first earbud and second earbud to the companion information handling system. For example, where the information handling system relative mapping system has discovered that the user has his or her back to the earbuds, the audible/graphical instructions may include instructions to the user to turn around. Other audible/graphical instructions may include instructions to move forward a certain number of steps, move left or right a certain number of steps, among other instructions. In an embodiment, further audible/graphical instructions may include a notice of how far away the user is from the information handling system relative mapping system. Each of these instructions are presented to the user via the first earbud speaker and second earbud speaker as described herein.

At block 870, the method 800 includes the user being directed to companion information handling system via audio instructions provided to user by via the speaker of the companion information handling system and/or the graphical display device of the companion information handling system. This process may take any amount of time based on the location of the user (e.g., holding the companion information handling system) relative to the earbuds and may require updated audio instructions to the user as those audible instructions are followed but the user has not reached the earbuds. In an embodiment, the user may be provided with a map that shows the user's position (e.g., position of the companion information handling system) relative to the earbuds. Additionally, the audible instructions may be repeated if the user has not acted on the instructions (e.g., based on current relative location data associated with the earbuds) within a period of time.

The method 800 includes determining if the companion information handling system has been found at block 875. In an embodiment, if the user has found the earbuds, the user may provide input at a graphical user interface (GUI) presented on a video display device of the companion information handling system to indicate that the user has found the earbuds. Without this input, the companion information handling system may determine that the earbuds have not been found and the method 800 returns to block 870 until the user has found the companion information handling system.

Where the user has found the earbuds (e.g., provided input via the video display device), the method 800 continues to block 880 with the processing device of the companion information handling system shutting down the relative mapping system at companion information handling system and HADM system (or ultrasonic sound signals from the companion information handling system) at earbuds. In an embodiment, the HADM system at the earbuds may be shut down so that the battery power of the earbuds may be conserved.

The method 800 further includes, at block 885, determining if the earbuds are still initiated. Where the earbuds are still operating, the method 800 may return to block 810 at FIG. 8A (e.g., as designated with an encircled "B") with monitoring for the user providing input to activate the relative mapping system on the earbuds as described herein. Where the earbuds have been shut down (e.g., put away in a charging station or disconnected from the wireless connection at the companion information handling system), the method 800 may end.

The blocks of the flow diagrams of FIGS. 3A, 3B, 4A, 4B, 5A, 5B, 8A, and 8B or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An earbud set comprising:
a first earbud including a first earbud speaker, and a first wireless radio wirelessly coupled to a companion information handling system;
a second earbud including a second earbud speaker, and a second wireless radio;
at least one of the first earbud and second earbud including a processor, a memory device, an accelerometer, and a magnetometer;
the processor executing computer readable code instructions of a relative mapping system to:
determine, with the magnetometer, a front-facing direction of each of the first earbud and second earbud as earbud compass data relative to magnetic earth and a first earbud fixed compass orientation for the first earbud and a second earbud fixed compass orientation for the second earbud relative to a front direction, a back direction, a left direction, and a right direction;
send, wirelessly, to a companion information handling system the earbud compass data to determine the first earbud fixed compass orientation for the first earbud and the second earbud fixed compass orientation for the second earbud relative in the front direction, the back direction, the left direction, and the right direction for a magnetic earth field compass direction of the companion information handling system; and
receive an angular alignment difference between the first earbud fixed compass orientation for the first earbud and the second earbud fixed compass orientation for the second earbud and a wirelessly-received magnetic earth compass direction of the companion information handling system;
the processor to use the first wireless radio for a first wireless distance measurement to the companion information handling system and the second wireless radio for a second wireless distance measurement to use the difference first wireless distance and the second wireless distance and the angular alignment difference to determine a distance and a direction to the companion information handling system;
the processor sending a find event code via the first wireless radio or second wireless radio to the companion information handling system to cause the companion information handling system to produce a haptic output, an audible output, or a combination thereof; and
the speaker to play companion location audio messages to find the companion information handling system.

2. The earbud set of claim 1, wherein determining, with the magnetometer, the front-facing direction of each of the first earbud and second earbud includes detecting an earth magnetic field to determine a north, south, east, and west direction relative to the earbud fixed compass orientation for the first earbud and the second earbud.

3. The earbud set of claim 1 further comprising:
the first or second wireless radio sending the earbud compass data to a companion information handling system to determine the earbud fixed compass orientation for the first earbud and the second earbud in the front-facing direction, a back direction, a left direction, and a right direction to compare relative to a magnetic earth field compass direction of the companion information handling system.

4. The earbud set of claim 1 further comprising:
the processor to receive input to activate the relative mapping system, the input including concurrent actuation of a control panel on the first earbud and second earbud.

5. The earbud set of claim 1 further comprising:
the processor to detect whether the first earbud and the second earbud have moved closer to the companion information handling system with the relative mapping system; and
the processor sending instruction to the speaker to play companion location audio messages indicating whether movement is closer to the companion information handling system.

6. The earbud set of claim 1 further comprising:
the speaker to play plural companion location audio messages to direct the user to align the earbud fixed compass orientation with an assigned alignment direction of first earbud and the second earbud to the magnetic earth field compass direction at the companion information handling system to determine a known orientation of the first earbud and the second earbud relative to the companion information handling system.

7. The earbud set of claim 1 further comprising:
the first wireless radio and the second wireless radio to transmit high accuracy distance measurement (HADM) signal data to the companion information handling system to determine a first distance from the first earbud to the companion information handling system and a second distance from the second earbud to the companion information handling system and compare the first distance to the second distance to determine an angular position of the companion information handling system to the first earbud and second earbud.

8. The earbud set of claim 1 further comprising:
the first wireless radio and the second wireless radio to transmit a ultrasonic signals via a first speaker and a second speaker to the companion information handling system or receive an ultrasonic signal from the companion information handling system via a first microphone and a second microphone to determine a first distance from the first earbud to the companion information handling system and a second distance from the second earbud to the companion information handling system and compare the first distance to the second distance to determine an angular position of the companion information handling system to the first earbud and second earbud.

9. An earbud set executing code instruction of a relative mapping system comprising:
a memory device and an earbud processor;
a first earbud including a first speaker and a first wireless radio wirelessly coupled to a companion information handling system;
a second earbud including a second speaker and a second wireless radio;
at least one of the first earbud and second earbud including the earbud processor and an earbud magnetometer;
the processor executing the code instructions for the relative mapping system to:
send a find device event code to the companion information handling system to cause the companion information handling system to produce a haptic output, an audible output, or a combination thereof and to receive a magnetic earth field compass direction of the companion information handling system;

determine, with the magnetometer, first earbud compass data relative to the magnetic earth field compass direction at the companion information handling system and relative to a front-facing assigned alignment direction of the first earbud in a first earbud fixed compass orientation and second earbud compass data relative to the magnetic earth field compass direction at the companion information handling system and relative to a front-facing assigned alignment direction of the second earbud in a second earbud fixed compass orientation;

determine an angular alignment difference between the front-facing assigned alignment direction of the first fixed compass orientation for the first earbud and the second fixed compass orientation for the second earbud and the magnetic earth field compass direction of the companion information handling system;

the first wireless radio or the second wireless radio transmit or receive, wirelessly, high accuracy distance measurement (HADM) signal data between the first earbud and the second earbud and the companion information handling system;

the processor to determine a first HADM distance from the first earbud to the companion information handling system and a second HADM distance from the second earbud to the companion information handling system and compare the first HADM distance to the second HADM distance to determine an angular position of the companion information handling system to the first earbud and the second earbud; and the processor to use the first HADM distance, the second HADM distance, and the angular position of the companion information handling system to the first earbud and the second earbud to determine a distance and a direction to the companion information handling system relative to the first earbud and the second earbud.

10. The device location system of claim 9, wherein determining, with the magnetometer, the front-facing assigned alignment direction of the first earbud and second earbud in an earbud fixed compass orientation relative to the earth's magnetic field includes to selecting the front-facing assigned alignment direction from a north, south, east, or west direction for the earbud fixed compass orientation to be aligned with received magnetic compass data of the corresponding compass direction relative to the earth's magnetic field.

11. The device location system of claim 9 further comprising:
The first speaker or the second speaker to play companion location audio messages to find the companion information handling system.

12. The device location system of claim 9 further comprising:
the processor to receive input to activate the relative mapping system, the input including concurrent actuation of a control panel on the first earbud and second earbud.

13. The device location system of claim 9 further comprising:
the processor to detect movement of the first earbud and the second earbud relative to the companion information handling system with the relative mapping system; and
the processor sending instruction to the speaker to play companion location audio messages indicating further movement directions toward to the companion information handling system.

14. The device location system of claim 9 further comprising:
a speaker to play the companion location audio messages to direct the user to align the fixed compass orientation for the first earbud and the second earbud to the magnetic earth field compass direction at the companion information handling system to determine a known position of the first earbud and the second earbud relative to one another and the companion information handling system.

15. The device location system of claim 9 further comprising:
the first speaker or the second speaker to provide audio messages including computer generated movement instructs to the user to listen to via the first earbud and second earbud to direct the user in distance and direction to the companion information handling system.

16. A method of operating a device location system comprising:
with an earbud processing device on at least one of a first earbud or second earbud, executing computer readable code instructions of a relative mapping system to determine, with the magnetometer, earbud compass data relative to a first earbud fixed compass orientation and assigned alignment direction for the first earbud and a second earbud fixed compass orientation and assigned alignment direction for the second earbud relative to a front direction, a back direction, a left direction, and a right direction;

sending, wirelessly, the earbud compass data to a companion information handling system to determine from the first fixed compass orientation and alignment direction for the first earbud and the second earbud fixed compass orientation and assigned alignment direction for the second earbud angular alignment difference from the front direction, the back direction, the left direction, and the right direction relative to a magnetic earth field compass direction of the companion information handling system;

playing companion location audio messages, via a speaker, to direct a user to align the fixed compass orientation for the first earbud and the second earbud to the magnetic earth field compass direction at the companion information handling system to determine a known position of the first earbud and the second earbud relative to one another and the companion information handling system;

determining from a first wireless distance measurement to the companion information handling system via a first wireless radio and a second wireless distance measurement via a second wireless radio to determine distance to the companion information handling system; and using a difference between the first wireless distance and the second wireless distance to determine the angular location of the companion information handling system.

17. The method of claim 16 further comprising:
playing companion location audio messages, via the speaker, to find the companion information handling system from the present location of the first earbud and the second earbud.

18. The method of claim 16 further comprising:
receiving input, via a control panel on the first earbud and second earbud, to activate the relative mapping system.

19. The method of claim 16 further comprising:
receiving input to activate the relative mapping system; and sending, via the first wireless radio or the second wireless radio, a find device event code to the companion information handling system to cause the companion information handling system to produce a haptic output, an audible output, or a combination thereof.

20. The method of claim 16 further comprising:

detecting, via the processor executing the relative mapping system, whether the first earbud and the second earbud have moved closer to the companion information handling system; and the processor sending instruction to the speaker to play companion location audio messages indicating whether movement is closer to the companion information handling system.

* * * * *